US009945749B2

(12) United States Patent
Andreaus et al.

(10) Patent No.: US 9,945,749 B2
(45) Date of Patent: Apr. 17, 2018

(54) IONIZATION VACUUM MEASURING CELL

(71) Applicant: INFICON GMBH, Bad Ragaz (CH)

(72) Inventors: Bernhard Andreaus, Rapperswil (CH); Rolf Enderes, Malans (CH); Martin Wuest, Malans (CH); Oskar Untermarzoner, Ruggeli (LI); Rudolf Stocker, Wattwil (CH)

(73) Assignee: INFICON GMBH, Bad Ragaz (CH)

( * ) Notice: Subject to any disclaimer, the term of this patent is extended or adjusted under 35 U.S.C. 154(b) by 0 days.

(21) Appl. No.: 14/773,250

(22) PCT Filed: Jul. 9, 2013

(86) PCT No.: PCT/EP2013/064511
§ 371 (c)(1),
(2) Date: Sep. 4, 2015

(87) PCT Pub. No.: WO2014/135229
PCT Pub. Date: Sep. 12, 2014

(65) Prior Publication Data
US 2016/0025587 A1    Jan. 28, 2016

(30) Foreign Application Priority Data

Mar. 6, 2013 (CH) ........................... 553/13

(51) Int. Cl.
*G01L 21/34* (2006.01)
*H01J 41/06* (2006.01)
(52) U.S. Cl.
CPC .............. *G01L 21/34* (2013.01); *H01J 41/06* (2013.01)

(58) Field of Classification Search
CPC ........... G01L 21/30; G01L 21/34; H01J 41/06
(Continued)

(56) References Cited

U.S. PATENT DOCUMENTS 5,317,270 A * 5/1994 Lethbridge ............. G01L 21/34
                                                 313/247
5,541,519 A * 7/1996 Stearns .................. G01N 27/70
                                                 324/455

(Continued)

FOREIGN PATENT DOCUMENTS

DE        2052094 A1    5/1971
DE        4207906 A1    9/1992
(Continued)

OTHER PUBLICATIONS

International Preliminary Report on Patentability for PCT/EP2013/064511 Filed on Jul. 9, 2013.

*Primary Examiner* — Jeff Natalini
(74) *Attorney, Agent, or Firm* — Notaro, Michalos & Zaccaria P.C.

(57) ABSTRACT

An ionization vacuum measuring cell comprises an anode ($3_A$) and a cathode ($4_K$) in a measuring chamber (107). The measuring chamber (107) is arranged in a housing (101) which has a vacuum-tight feedthrough (103) for a connection rod (104) of the cathode ($4_K$) towards the outside. The measuring chamber (107) holds the rod (104) in a feedthrough (109) which is electrically insulating only. The measuring chamber (107) in the housing (101) can be exchanged by a releasable plug connection (106).

18 Claims, 14 Drawing Sheets

Figure 1A:
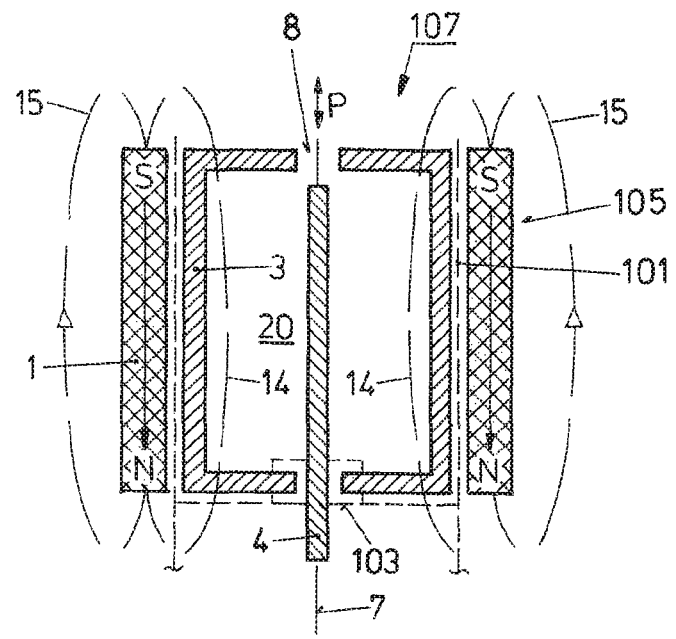

(58) Field of Classification Search
USPC .................................................. 324/459–470
See application file for complete search history.

(56) References Cited

U.S. PATENT DOCUMENTS

| | | | |
|---|---|---|---|
| 2003/0057953 A1* | 3/2003 | Rutherford | G01L 21/34 324/460 |
| 2006/0202701 A1* | 9/2006 | Knapp | G01L 21/12 324/460 |
| 2010/0259273 A1 | 10/2010 | Kawasaki | |
| 2012/0169347 A1* | 7/2012 | Wei | G01L 21/34 324/459 |
| 2013/0154658 A1* | 6/2013 | Shinada | G01N 27/70 324/464 |

FOREIGN PATENT DOCUMENTS

| | | |
|---|---|---|
| DE | 29614489 U1 | 10/1996 |
| DE | 60003249 T2 | 7/2004 |
| JP | 48-086884 U | 10/1973 |
| JP | H1019711 A | 1/1998 |
| JP | 2010145119 A | 7/2010 |
| WO | 2008/051603 A2 | 5/2008 |
| WO | 2010/033851 A1 | 3/2013 |

* cited by examiner

IONIZATION VACUUM MEASURING CELL

DEFINITION

In the present description and the claims, we understand the term "feedthrough" as a substantially rod-shaped component, the holding arrangement used to mount this component to a plate-shaped second component and which protrudes thereon through the plate-shaped component. The feedthrough can be understood as also comprising the rod-shaped component or not comprising it, depending on whether it is permanently or detachably connected to this component. In any case, the rod-shaped component on the feedthrough is in direct contact with a solid body of the feedthrough. Therefore, a clear opening in the plate-shaped component through which a rod-shaped component protrudes is not a feedthrough in the meaning used here.

If the feedthrough is electrically insulating or insulated, an electrical insulation between the rod-shaped component and the plate-shaped component is then produced thereby.

If the feedthrough is vacuum-tight, then no or practically no gas leak results through it, with the introduced rod-shaped component, from one side of the plate-shaped component to the other side thereof.

First Aspect

The invention relates in its first aspect to an ionization vacuum measuring cell. It comprises a housing having a measuring fitting for the vacuum to be measured at an end section of the housing. The measuring fitting is an arrangement of one or more openings in the claimed housing end section, through which the ambient vacuum atmosphere to be measured extends into the housing.

A measuring chamber is provided in the housing which, i.e., the interior of which, is connected to form a gas flow to the mentioned measuring fitting of the housing. This connection is such that, in the measuring chamber, the pressure adjusts very rapidly to this pressure to be measured, practically without delay, in the event of change of the pressure to be measured in the ambient atmosphere. The pressure to be measured is the pressure directly at the measuring fitting in this case.

A first and a second electrodes are provided in the measuring chamber. These electrodes are formed substantially coaxially with respect to an axis and are arranged spaced apart from one another.

An ionization space is formed in the measuring chamber between these two electrodes, in which, upon application of a corresponding electrical potential difference between the electrodes, the gas is ionized. The first of the electrodes has a substantially cylindrical inner surface as the electrode surface facing toward the ionization space.

A feedthrough which is both electrically insulating as well as vacuum-tight is provided for an electrical supply to one of the electrodes or for one of the electrodes itself, having an electrical insulator with respect to parts of the measuring cell, which are set at a different electrical potential than that of the fed-through supply or electrode.

The surfaces exposed to the ionization space in such an ionization vacuum measuring cell are known to be subjected to impairments, in particular deposits, which makes the repeated cleaning thereof necessary. This requires correspondingly long shutdown times of the ionization vacuum measuring cell and processes dependent on the measuring result thereof.

To solve the problem of keeping the ionization vacuum measuring cell in operation longer on average with respect to time, the measuring cell is now furthermore designed as a replaceable component.

Since the measuring chamber contains the first electrode in any case, which has a substantially cylindrical and therefore relatively large inner surface, which is freely exposed to the ionization space and the corresponding contamination in any case, by way of this embodiment of the ionization vacuum measuring cell according to the invention, a time-consuming cleaning of at least the mentioned large-area electrode which becomes necessary can be performed without significant interruption of the operation of the ionization vacuum measuring cell. On the mentioned cell, the contaminated measuring chamber is replaced by a cleaned or a new measuring chamber.

The modular component concept for the measuring chamber furthermore enables differently conceived measuring chambers to be used flexibly on the same ionization vacuum measuring cell or, vice versa, the same measuring chamber to be used on otherwise differently conceived ionization vacuum measuring cells.

The manufacturing of the ionization vacuum measuring cells becomes more efficient in that, on the one hand, as installation modules, different measuring chambers having, for example, uniform external geometry can also be manufactured, and the remaining parts of the ionization vacuum measuring cell having geometry compatible therewith, and, depending on the specific application, the respective ionization vacuum measuring cell can be flexibly assembled as desired with the corresponding measuring chambers.

In embodiments of the ionization vacuum measuring cell according to the invention, which are combinable with all embodiments still to be mentioned of the ionization vacuum measuring cell according to the invention under all aspects, if not contradictory, the measuring chamber is delimited radially to the outside with respect to the axis of the cell, in one alternative, by the first electrode having the essentially cylindrical inner surface.

Therefore, this electrode, except for the end faces, practically forms a measuring chamber housing. The ionization space is essentially identical to the interior of the measuring chamber.

In a second alternative, the measuring chamber is delimited radially to the outside with respect to the axis by a measuring chamber housing which rests entirely, sectionally, or not at all on an inner surface of the housing, having essentially cylindrical inner surface, which is offset radially outward from the first electrode.

Therefore, the measuring chamber has a separate housing, which forms neither an electrode nor the wall of the housing. Nonetheless, this measuring chamber housing can rest sectionally on the inner surface of the housing, for example, can be guided and mounted thereon for the replacement operation. The measuring chamber housing can also rest with its outer surface entirely on the inner surface of the housing. In the portion in which the measuring chamber is arranged, the housing is practically double-walled in this embodiment.

In the third alternative, the measuring chamber is delimited radially to the outside with respect to the axis by at least one axial portion of the wall of the housing.

In this variant, the wall of the housing is formed by the measuring chamber wall in the portion which the measuring chamber is mounted or, considered in reverse, the measuring chamber wall is formed therein by a part of the housing wall.

In embodiments of the ionization vacuum measuring cell according to the invention, which are combinable with all above-mentioned embodiments and embodiments still to be mentioned of the ionization vacuum measuring cell according to the invention under every aspect, if not contradictory, the measuring chamber has, on the axial end facing away from the measuring fitting, a non-vacuum-tight, electrically insulating feedthrough for the electrical supply to one of the electrodes or for one of the electrodes itself.

If the mentioned non-vacuum-tight, electrically insulated feedthrough for the supply to one of the electrodes or for one of the electrodes itself is provided on the measuring chamber, on the end facing away from the measuring fitting, in addition, the feedthrough which is both electrically insulated as well as vacuum-tight is thus to be provided for this supply or this electrode itself, outside the measuring chamber and therefore not replaceable with the latter. Since, however, both mentioned feedthroughs are provided for the same electrical supply or for the same electrode, the two feedthroughs, on the one hand part of the replaceable measuring chamber, on the other hand outside the measuring chamber, can be aligned to one another so that, with respect to contamination, the feedthrough on the measuring chamber side, which is not vacuum-tight, shields the feedthrough arranged outside the measuring chamber, which is also vacuum-tight.

It is therefore achieved that the electrically insulating and vacuum-tight feedthrough is shielded from contamination and, with replacement of the measuring chamber, the surfaces of the feedthrough exposed to the ionization space are also replaced.

It is to be considered in this case that the non-vacuum-tight feedthrough on the measuring chamber is substantially simpler and more cost-effective to produce than the feedthrough which is both electrically insulated as well as vacuum-tight, and which is not replaceable with the measuring chamber. However, the more complex, more costly, non-replaceable feedthrough is shielded from contaminations using the more cost-effective feedthrough, which is replaceable.

In one alternative, the replaceable measuring chamber comprises, on the axial end facing away from the measuring fitting, the feedthrough which is both electrically insulated as well as vacuum-tight.

The provision of a second feedthrough, which is also not vacuum-tight, according to the just-mentioned first alternative is thus avoided.

In embodiments of the ionization vacuum measuring cell according to the invention, which are combinable with all already mentioned embodiments and embodiments still to be mentioned of the ionization vacuum measuring cell according to the invention under all aspects, if not contradictory, the measuring chamber, on the measuring fitting side, is insertable in or on the housing up to a stop and is detachably lockable on the housing, wherein for this purpose a screw connection or a carabiner connection is preferably provided between measuring chamber and housing or at least one axially or radially locking element acting between housing and measuring chamber, preferably a snap ring or a ball catch arrangement.

In embodiments of the ionization vacuum measuring cell according to the invention, which are combinable with all already mentioned embodiments and embodiments still to be mentioned of the ionization vacuum measuring cell according to the invention under all aspects, if not contradictory, the measuring cell has, radially outside the measuring chamber, at least one part of a magnetization arrangement, which generates a magnetic field in the ionization space.

A magnetization arrangement is understood as an arrangement of permanent magnets with or without passive magnetic field guiding elements, such as yokes, pole shoes, shunts, for example, each made of ferromagnetic material.

The ionization vacuum measuring cell according to the invention having the first aspect can be practically any type of such measuring cells. In particular, however, it relates in this case to measuring cells, in the ionization space of which, in addition to the electrical field, a magnetic field is also generated at an angle thereto, to increase the ionization rate. Reference is made to the further description with respect to description of the last-mentioned types of ionization vacuum measuring cells.

The invention furthermore relates to a measuring chamber for an ionization vacuum measuring cell of the above-explained type, including all claimed embodiment variants.

A presently implemented ionization vacuum measuring cell according to the invention comprises:

a) a housing, which can be evacuated, having a measuring fitting for the vacuum to be measured, b) a first and a second electrodes, which are arranged essentially coaxially and spaced apart from one another, and having a common axis, whereby a measuring chamber is formed between these two electrodes, which is arranged communicating with the measuring fitting, wherein the first electrode forms the outer electrode and it is essentially has a cylindrical surface, and the second electrode is designed rod-shaped and is located on the axis.

Furthermore, it comprises:

c) an electrically insulating vacuum-tight feedthrough arranged on one end of the housing on the side opposite to the measuring fitting, wherein it has an insulator arranged about the axis and the second rod-shaped electrode is guided through this insulator to form a seal.

Furthermore, it comprises:

d) at least one permanent magnet ring, which encloses the coaxial arrangement of the electrodes, having magnetization direction aligned essentially radially in relation to the axis and having a ferromagnetic yoke enclosing this permanent magnet ring.

The yoke is guided away from the permanent magnet ring in the axial direction on both sides and—viewed in longitudinal section—guided after a predefined distance from the permanent magnet ring on both sides in the radial direction toward the axis and the first electrode, wherein this first electrode forms the outer electrode of the coaxial arrangement of the electrodes, such that the yoke forms two ring-shaped poles on both sides and spaced apart from the permanent magnet ring, via which at least a part of the field lines of the permanent magnet ring close inside the measuring chamber, while penetrating the first electrode, wherein a ring-shaped tunnel-type magnetic field is formed around the axis at least partially via the first electrode inside the measuring chamber. Disk-shaped ferromagnetic guide means are arranged in the radial direction, oriented toward the axis, in the region of at least one of the internal poles of the yoke, which are formed as the first and second pole disks and the center of which has an opening in each case around the axis for guiding through the second electrode and for the measuring gas passage, wherein a shielding device is arranged between the feedthrough and the second pole disk facing toward it in the radial region of the insulator and coaxially to the axis to protect the insulator from contamination by atomized particles from the measuring chamber, which forms an ionization space, and at least the first electrode is installed in a replaceable insertion chamber.

Second Aspect

An ionization space, which is open to an atmosphere to be measured with respect to pressure and is otherwise vacuum-tight, is always provided on an ionization vacuum measuring cell. The two electrodes, between which a high electrical field is generated, are active therein. The required electrical potential therefore has to be supplied to at least one of the two electrodes via an electrically conductive, vacuum-tight supply or this electrode itself must be inserted via such a feedthrough into the ionization chamber. If the second electrode is not operated at reference potential, like the potential of a housing of the cell, and therefore the section between the electrodes is electrically floating with respect to reference potential, such a feedthrough is then also to be provided if necessary for the second electrode.

In the second aspect of the present invention, a novel electrically insulating, vacuum-tight feedthrough is to be provided in the mentioned ionization vacuum measuring cell.

This is achieved by the ionization vacuum measuring cell, which comprises:
a) a housing having a measuring fitting for the vacuum to be measured, at one end section of the housing,
b) a first and a second electrodes in the housing, whereby an ionization space is formed inside the housing between these two electrodes,
c) a both electrically insulating as well as vacuum-tight feedthrough for an electrical supply to one of the electrodes or for the one electrode itself, having an electrical insulator with respect to other parts of the cell, which are not operated at the same electrical potential as the supply or the electrode. In this case, the mentioned supply or the electrode which is fed through is essentially a metal rod on an axis. The feedthrough comprises
i) a ceramic cylinder, which is coaxial to the axis, having inner surface spaced apart radially from the ride,
ii) a first glass ring, which is fused on the inner surface on one side and the rod on the other side, and is set back axially from an end face of the ceramic cylinder facing toward the ionization space,
iii) a metal fitting having a cylinder opening coaxial to the axis, having opening inner surface spaced apart radially from the cylindrical outer surface of the ceramic cylinder,
iv) a second glass ring, which is fused onto the cylindrical outer surface of the ceramic cylinder, and is preferably also set back axially from the end face of the ceramic cylinder facing toward the ionization space,
v) wherein the opening inner surface is connected vacuum-tight to the second glass ring.

In consideration of the low volume and surface conductivity, which must be ensured on the mentioned feedthrough, to also ensure the electrical insulation capability thereof with respect to leakage currents in the case of high voltages or potential differences via the feedthrough, the mentioned insulation must have a relatively large radial extension with respect to the feedthrough axis. The mentioned radial extension of the feedthrough is ensured cost-effectively using the glass/ceramic insulation. In addition, the path for leakage currents is substantially lengthened in that the ceramic cylinder protrudes beyond the mentioned glass rings toward the ionization space, which is simple to implement in manufacturing by providing the protruding ceramic cylinder, on the one hand, and the glass rings, which are simple to produce in set-back form. The mentioned features of the feedthrough on the ionization vacuum measuring cell in the second aspect of the present application described here is combinable with all embodiments of the ionization vacuum measuring cell in the first aspect of the present application, if it is not contradictory thereto.

In one embodiment of the measuring cell according to the invention of the type mentioned, the electrodes are arranged essentially coaxially with respect to the axis, wherein the first electrode has an essentially cylindrical inner surface as the electrode surface facing toward the ionization space, spaced radially apart from the mentioned axis.

If the second electrode forms the above-mentioned metal rod which is fed through, the electrode arrangement is then constructed as is typical in magnetron cells or cells having inverted magnetron arrangement, reference being made to the following statements in this regard.

If the second electrode is designed as ring-shaped, for example, on both end sides of the essentially cylindrical inner surface of the first electrode, the cell is then constructed with respect to electrode arrangement as is typical in Penning cells, wherein reference is also made to the following statements in this regard.

This embodiment of the ionization vacuum measuring cell in the second aspect of the application can also be combined with all embodiments of the measuring cell still to be explained hereafter in the second aspect, but also with all embodiments of the measuring cell in the first aspect of the present application, if not contradictory thereto.

In one embodiment of the ionization vacuum measuring cell according to the invention in the second aspect of the application, the second glass ring is fused onto the opening inner surface. This embodiment is combinable with all above-mentioned embodiments and embodiments still to be mentioned of the measuring cell in the first aspect and in the second aspect of the present application, if not contradictory thereto.

In one embodiment of the ionization vacuum measuring cell according to the invention, combinable with all above-mentioned embodiments and embodiments still to be mentioned of the measuring cell in the first aspect and in the second aspect of the present application, if not contradictory thereto, the second glass ring is connected to form a seal to the opening inner surface via one or more pairs of a further coaxial ceramic cylinder/a further coaxial glass ring, wherein preferably each further glass ring of a pair is set back with respect to the end face, which faces toward the ionization space, of the further ceramic cylinder of the pair, on which the further glass ring is fused.

Therefore, observed in the radial direction of the feedthrough with respect to the mentioned axis, a series sequence of glass/ceramic up to the opening inner surface of the metal fitting is produced, wherein practically arbitrary radial extensions of the feedthrough can be readily manufactured cost-effectively.

If the mentioned feedthrough is freely exposed to the ionization space on one side thereof, an interfering coating contamination on the corresponding feedthrough surfaces is thus often of significant concern. The longer the radial extension of the feedthrough, the lesser the influence of such an interfering coating is. In this embodiment, the additionally provided ceramic cylinder/glass ring pairs are implemented having ceramic cylinders which are set forward with respect to the glass rings toward the ionization space, at least on a part of the provided pairs. The leakage current paths are thus lengthened further.

Further sensors are often integrated on ionization vacuum measuring cells, for example, Pirani sensors or capacitive membrane pressure sensors. For this purpose, further feedthroughs must be provided for metal pins or rods on the ionization vacuum measuring cell. This is also the case when both mentioned electrodes are to be operated electrically floating with respect to a cell housing, or the housing is operated as electrically floating and reference potential, such as ground potential, is to be applied to one of the mentioned electrodes. For this purpose, a further embodiment of the ionization vacuum measuring cell according to the invention in the second aspect is proposed, which is again combinable with all above-mentioned embodiments and embodiments still to be mentioned of the measuring cell in the first aspect and in the second aspect of the present application, if not contradictory thereto. Accordingly, one or more through boreholes is/are provided through the metal fitting, the borehole axes of which are either parallel to the mentioned axis of the feedthrough or skewed in relation thereto. The mentioned through boreholes have in any case a directional component of the borehole axes thereof which is parallel to the mentioned feedthrough axis. The mentioned one or multiple feedthroughs through the metal fitting have inner borehole surfaces, which each define the borehole axes, and a metal feedthrough rod is arranged in at least a part of the mentioned through boreholes, in the respective borehole axis. The respective inner borehole surfaces and the respective feedthrough rod are fused with a glass insert to form a seal. If the metal fittings are used quasi-standardized for various conceptions of the ionization vacuum measuring cell, and with a specific number of the mentioned through boreholes, which are not used on all conceptions, it is thus readily possible to provide a part of the mentioned boreholes specifically for one or another conception of the ionization vacuum measuring cell without metal feedthrough rod and solely to close them to form a seal using a glass insert.

Greatly varying materials are provided on the heretofore explained feedthrough, progressing radially outward coaxially in relation to the feedthrough axis, thus at least one metal rod, then glass of the first glass ring, then a ceramic cylinder, then in turn glass of the second glass ring, and, depending on the design variant of the metal fitting or interposed, one or more pairs of further ceramic cylinders/glass rings. This feedthrough is sometimes subjected to inhomogeneous thermal stresses, in particular during its manufacturing, i.e., fusing of the glass, which is typically provided as a glass powder, with the adjoining surfaces, ceramic or metal, but possibly also during applications stressed with high temperatures. The mentioned glass/metal/ceramic pairs result in this case in high tensions in the feedthrough parts, caused, inter alia, by different coefficients of thermal expansion of the mentioned material and possibly also materials which are not absolutely homogeneous in practice.

This results in a hardly predictable warping on the metal fitting which is located farthest radially outward, which can have severe consequences in particular if, according to the last-mentioned embodiment variant, glass-insulated and vacuum-tight further feedthroughs are provided on the metal fitting, but in no case necessarily all spaced apart equally radially with respect to the feedthrough axis and in no case necessarily uniformly distributed azimuthally on the metal fitting.

Because of the mentioned stresses in the metal fitting, corresponding stresses result in the one or the multiple glass inserts, which can result in hairline cracks in the mentioned glass inserts. Such cracks do not have to occur immediately during or after the mentioned temperature strain. The stresses which have built up can have the result, however, that substantially later, during the cell assembly or the usage thereof, the mentioned cracks result due to quite small mechanical strains, such as shocks or impacts, and are only recognized in a complex manner in the event of incorrect behavior of the measuring cell.

In a further embodiment of the ionization vacuum measuring cell, which is again combinable with all above-mentioned embodiments of the ionization vacuum measuring cell in the first aspect and in the second aspect of the present application, and with embodiments still to be explained, if not contradictory thereto, the metal fitting comprises an inner ring, which forms the opening of the metal fitting with its inner opening. The metal fitting furthermore has, in addition to the mentioned inner ring, a further part, which is preferably formed as an outer ring. The mentioned further part has a further opening coaxial to the axis of the feedthrough. The inner ring and the further part of the metal fitting are connected vacuum-tight by means of a bridge part ring. The bridge part ring is formed either by a connecting seam, preferably a weld seam or solder seam, or, if inner ring and a further part of the metal fitting are integrally formed, by a ring web which establishes the mentioned one-piece design.

Primarily, the mentioned inner ring and the further part of the metal fitting having opening coaxial to the mentioned inner ring can functionally be considered to be two independent parts. The sealing integrity of these two parts is established by the mentioned connecting seam or the mentioned ring web. The latter are capable as a result of their material, in the case of the connecting seam, or the dimension thereof in the case of the web implementation, practically as tension buffer zones, of dissipating the tensions arising in the inner ring like a spring element with respect to the further part and distributing homogeneously them in the mentioned further part, considered azimuthally around the feedthrough axis.

If through boreholes of the above-mentioned type having a directional component axially parallel with respect to the feedthrough axis and having inner borehole surfaces are provided with respect to the axis of the feedthrough in the metal fitting, which each define a borehole axis, wherein a metal feedthrough rod is arranged in at least a part of these boreholes, in the respective borehole axis, wherein the respective inner borehole surface and the respective feedthrough rod are fused with a glass insert to form a seal, such feedthroughs are thus installed in the last-mentioned embodiment in the further part of the metal fitting. Because of the mentioned reduction of the stresses in the further part of the metal fitting and the homogenization thereof, in spite of high temperature stresses of the feedthrough, in particular during its manufacturing, the glass inserts on the mentioned feedthroughs in the further part remain unimpaired even over long operating times, i.e., stresses resulting in cracking do not arise or remain therein.

It is entirely possible to provide multiple coaxial rings on the mentioned metal fitting, each connected using a connecting seam, preferably a weld seam or solder seam, or using one of the mentioned ring webs, and to connect the last of these rings, typically the radial outermost located or the most spaced apart axially from the innermost ring, using one of the mentioned connecting seams or using one of the mentioned webs, to the further part of the metal fitting. Therefore, if necessary, a vacuum-tight structure similar to a bellows is established between glass ring and rigid further part of the metal fitting, optionally having the mentioned further feedthroughs.

In further embodiments of the just-mentioned embodiment of the ionization vacuum measuring cell according to the second aspect of the present application, the mentioned inner ring of the metal fitting and the opening in the further part of the mentioned metal fitting are axially aligned on one another or they are offset in relation to one another in this direction. The latter enables, if structurally desired, the outer radius of the inner ring to be formed independently of the radius of the opening in the further part of the metal fitting and the inner ring or the further part to be mounted on one another in the radial direction, movably guided.

In a further embodiment of the ionization vacuum measuring cell in the second aspect of the present application, which is combinable with all embodiments of the ionization vacuum measuring cell in the first aspect of the application and with the embodiments still to be mentioned, however, if not contradictory thereto, at least the electrically insulated and vacuum-tight feedthrough for the electrical supply to one of the electrodes or for one of the electrodes itself is shielded from contamination toward the ionization space by a further non-vacuum-tight, electrically insulating feedthrough.

The effectiveness of the mentioned electrically insulating and vacuum-tight feedthrough can, as already mentioned, be impaired by contamination, such as coating with material sputtered off in the ionization space. Although it is well-designed according to the invention, in particular with respect to manufacturing and therefore manufacturing costs, this feedthrough remains complex because of its double function. The mentioned impairment of this complex feedthrough is now shielded in the last-mentioned embodiment by a feedthrough installed between ionization space and the mentioned double function-feedthrough, which is only electrically insulating and is not vacuum-tight. In particular because the latter is substantially less complex in the manufacturing, using this simpler feedthrough, the effectiveness of the mentioned, complex, and costly double-function feedthrough is maintained over longer operating times.

In a further embodiment of the ionization vacuum measuring cell, which is combinable with all above-mentioned embodiments of the measuring cell in the first aspect and the second aspect of the present invention, and with the embodiments still to be mentioned, if not contradictory thereto, an electrically conductive plate arrangement, having an opening coaxial to the mentioned feedthrough, is provided spaced apart from the electrical and vacuum-tight feedthrough in the axial direction toward the ionization space. The electrical supply to one of the electrodes or the one of the electrodes itself protrudes through this opening toward the ionization space. The mentioned opening in the plate arrangement is enclosed by a cylinder protruding from the surface of the plate arrangement facing toward the feedthrough, which protrudes into the ceramic cylinder of the feedthrough without contact or protrudes externally beyond the ceramic cylinder of the feedthrough without contact.

In a presently preferred embodiment, the ionization vacuum measuring cell comprises:
a) a housing, which can be evacuated, having a measuring fitting for the vacuum to be measured,
b) a first and a second electrodes, which are arranged essentially coaxially and spaced apart from one another, and having a common axis, whereby a measuring chamber is formed between these two electrodes, which is arranged communicating with the measuring fitting, wherein the first electrode forms the outer electrode and it is essentially has a cylindrical surface, and the second electrode is designed rod-shaped and is located on the axis,
c) an electrically insulating vacuum-tight feedthrough arranged on one end of the housing on the side opposite to the measuring fitting, wherein it has an insulator arranged about the axis and the second rod-shaped electrode is guided through this insulator to form a seal,
d) at least one permanent magnet ring, which encloses the coaxial arrangement of the electrodes, having magnetization direction aligned essentially radially in relation to the axis and having a ferromagnetic yoke enclosing this permanent magnet ring, wherein furthermore the yoke is guided away from the permanent magnet ring in the axial direction on both sides and—viewed in longitudinal section—guided after a predefined distance from the permanent magnet ring on both sides in the radial direction toward the axis and the first electrode, wherein this first electrode forms the outer electrode of the coaxial arrangement of the electrodes, such that the yoke forms two ring-shaped poles on both sides and spaced apart from the permanent magnet ring, via which at least a part of the field lines of the permanent magnet ring close inside the measuring chamber, while penetrating the first electrode, wherein a ring-shaped tunnel-type magnetic field is formed around the axis at least partially via the first electrode inside the measuring chamber and disk-shaped ferromagnetic guide means are arranged in the radial direction, oriented toward the axis, in the region of at least one of the internal poles of the yoke, which are formed as the first and second pole disks and the center of which has an opening in each case around the axis for guiding through the second electrode and for the measuring gas passage, wherein a shielding device is arranged between the feedthrough and the second pole disk facing toward it in the radial region of the insulator and coaxially to the axis to protect the insulator from contamination by atomized particles from the measuring chamber, which forms an ionization space, and the insulator comprises a ceramic cylinder having an inner surface facing toward the second electrode, and a glass ring fused thereon and on the second electrode.

As was already mentioned, features of the ionization vacuum measuring cell explained in the first aspect may be combined with the ionization vacuum measuring cell explained in the second aspect, if such a combination does not result in contradictions, of course, and an ionization vacuum measuring cell is thus provided on which the respective mentioned advantages are implemented both with respect to ability to disassemble as well as with respect to the feedthrough.

The invention will be explained further hereafter for exemplary purposes under all aspects on the basis of further embodiments, examples, and figures.

Figure 1B:
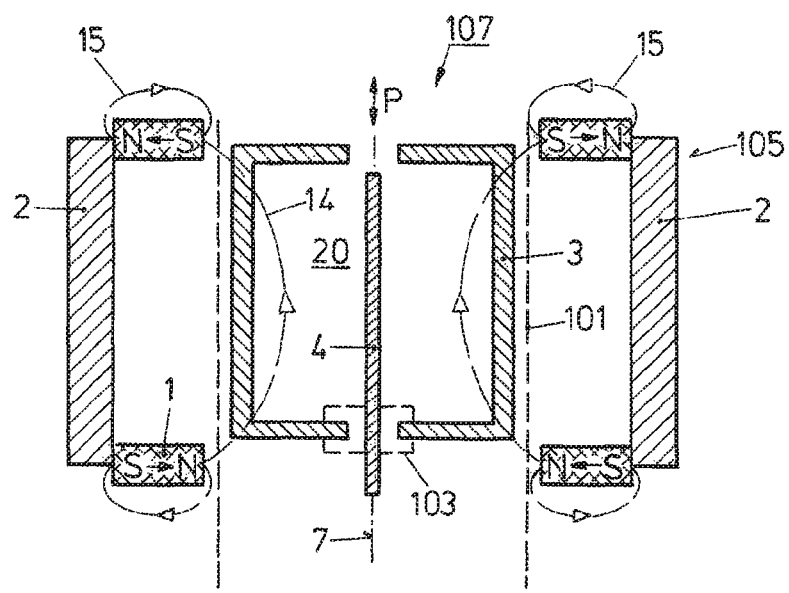
Figure 1C:
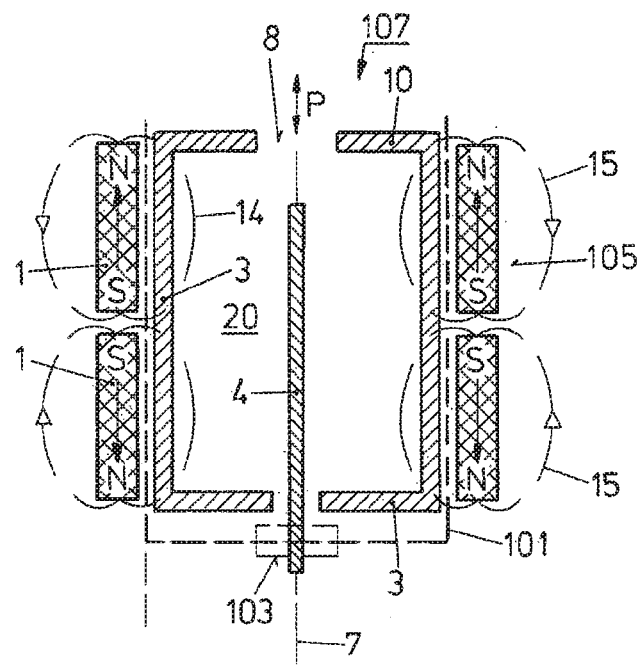
Figure 2A:
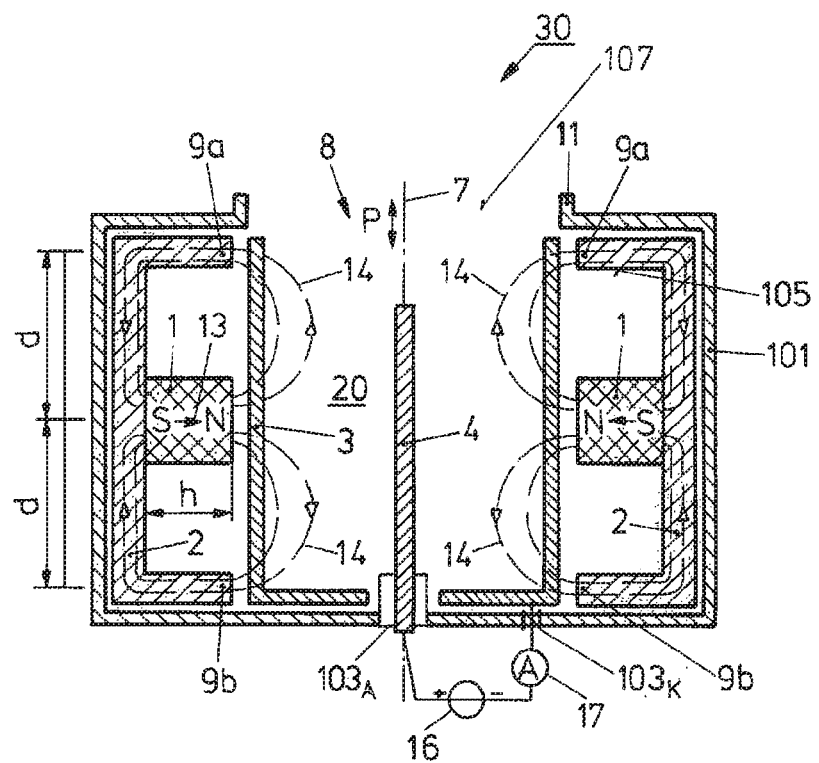
Figure 2B:
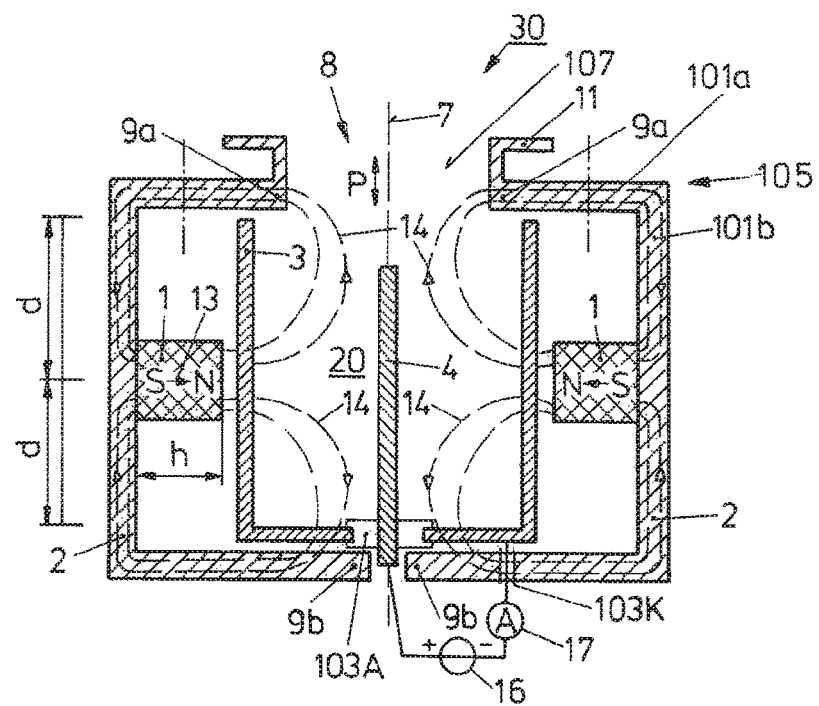
Figure 2C:
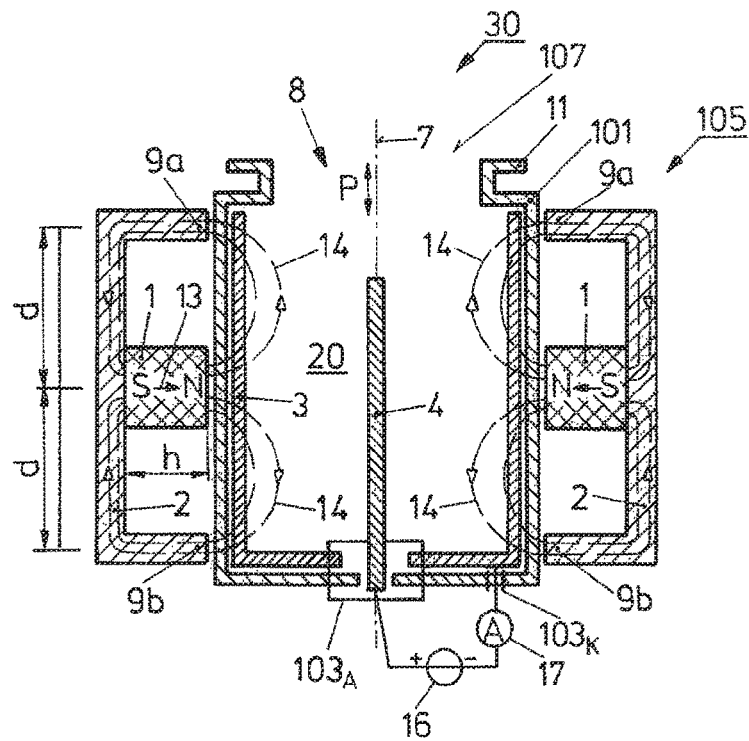
Figure 2D:
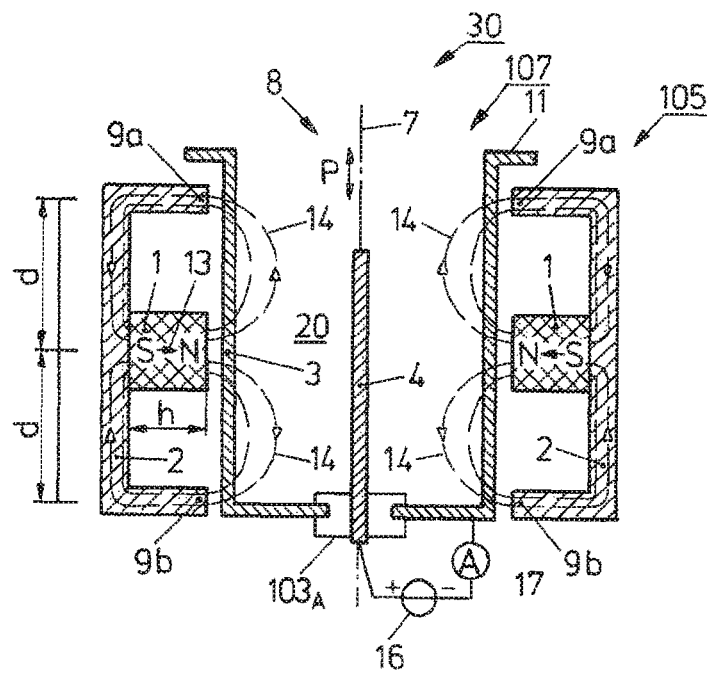
Figure 2E:
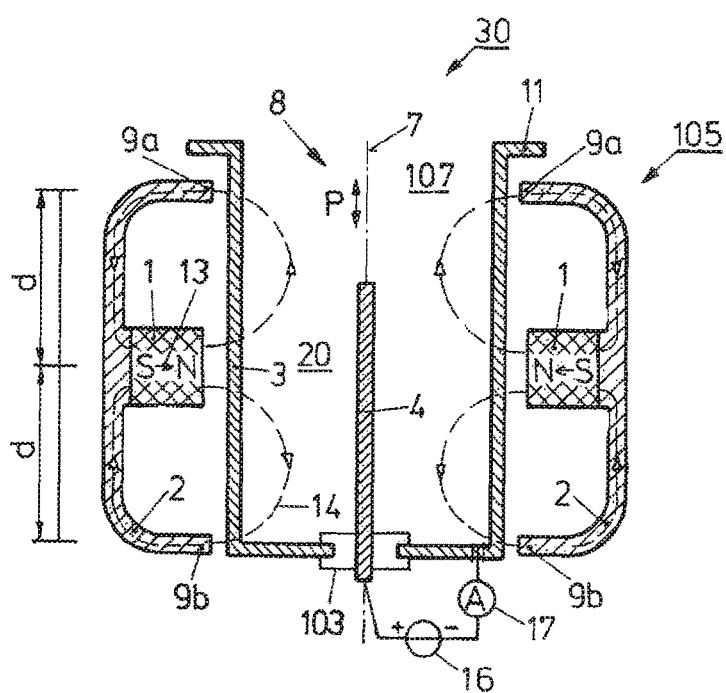
Figure 3:
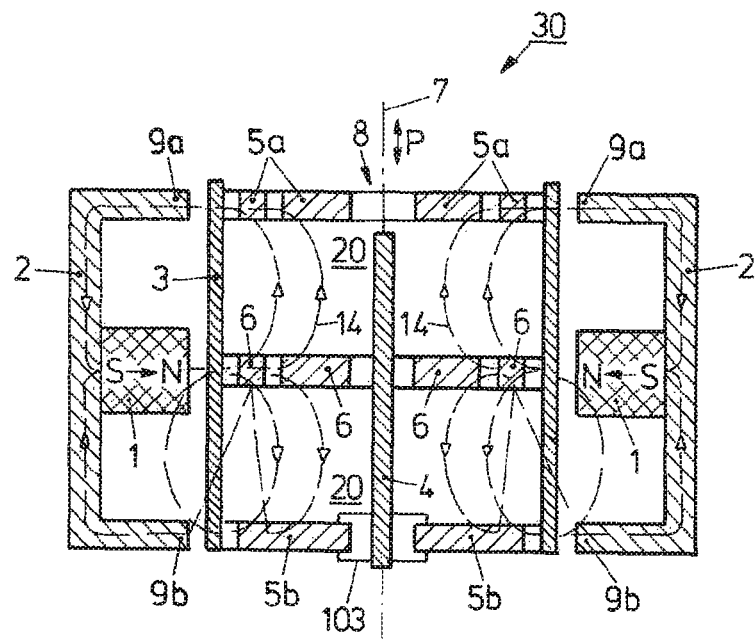
Figure 4:
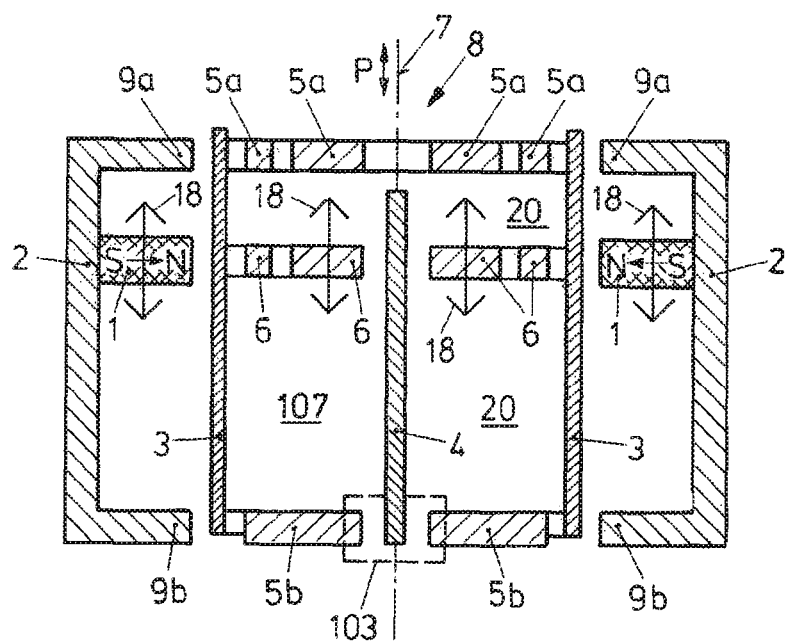
Figure 5A:
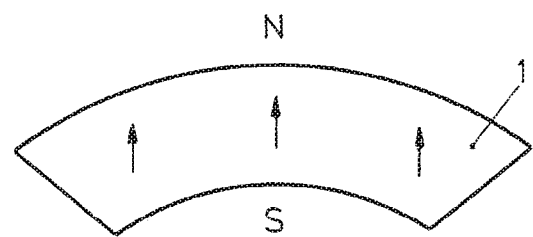
Figure 5B:
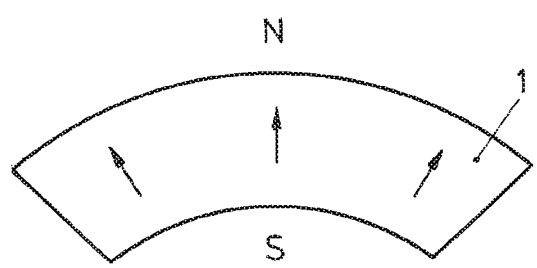
Figure 5C:
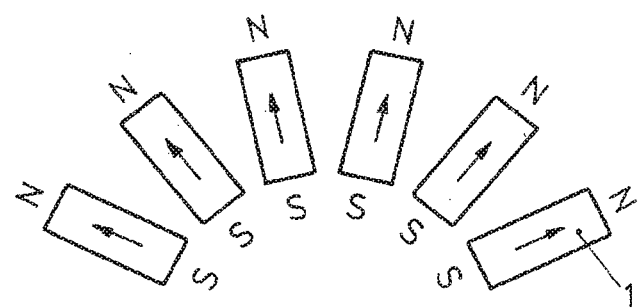
Figure 6A:
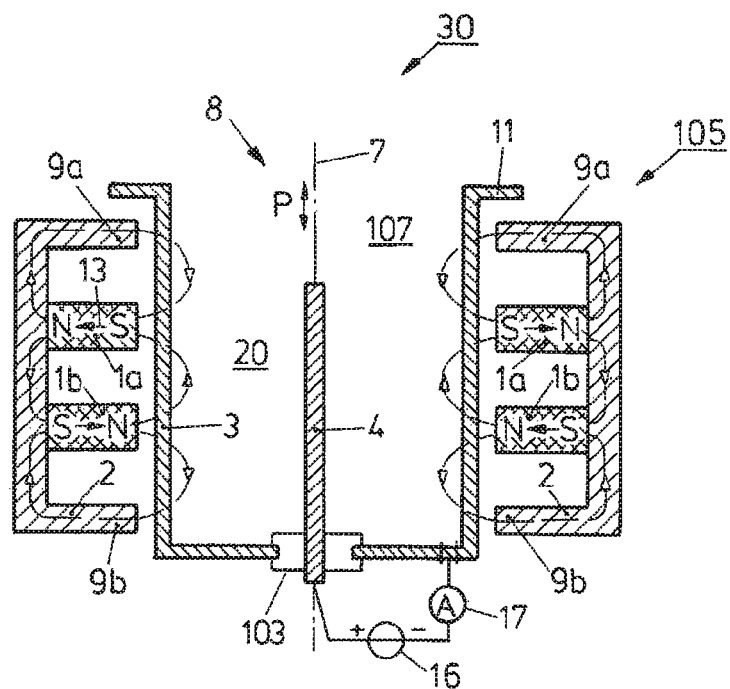
Figure 6B:
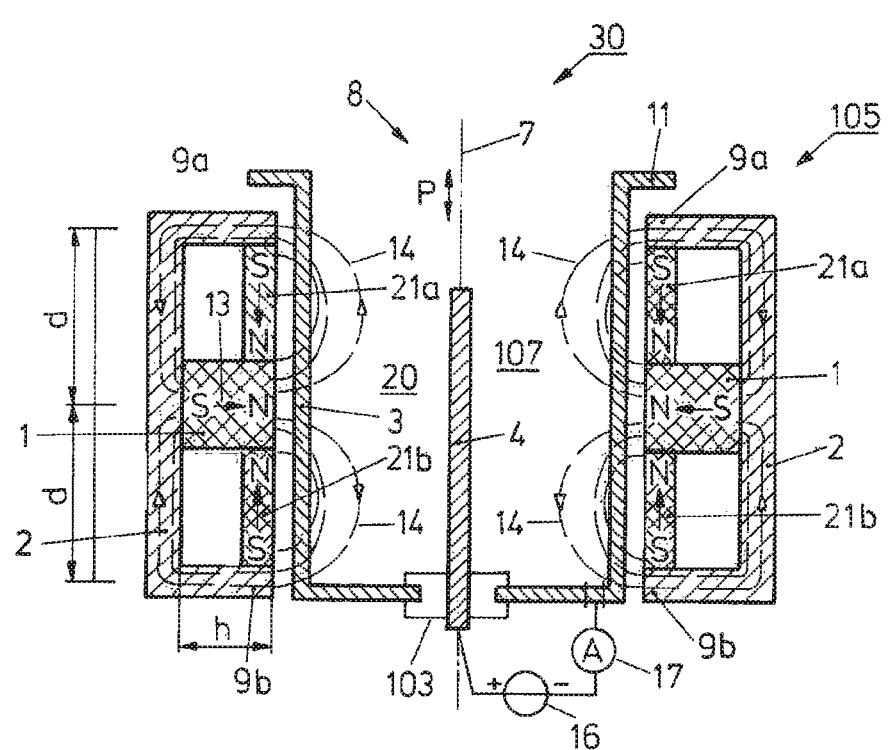
Figure 7:
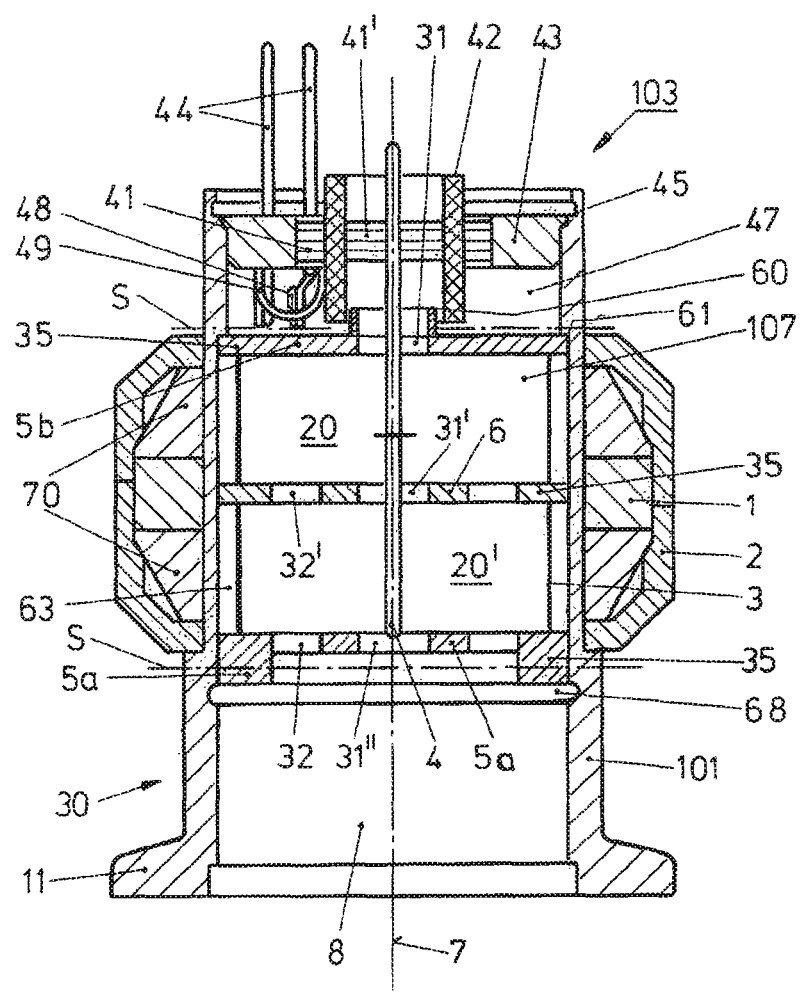
Figure 8:
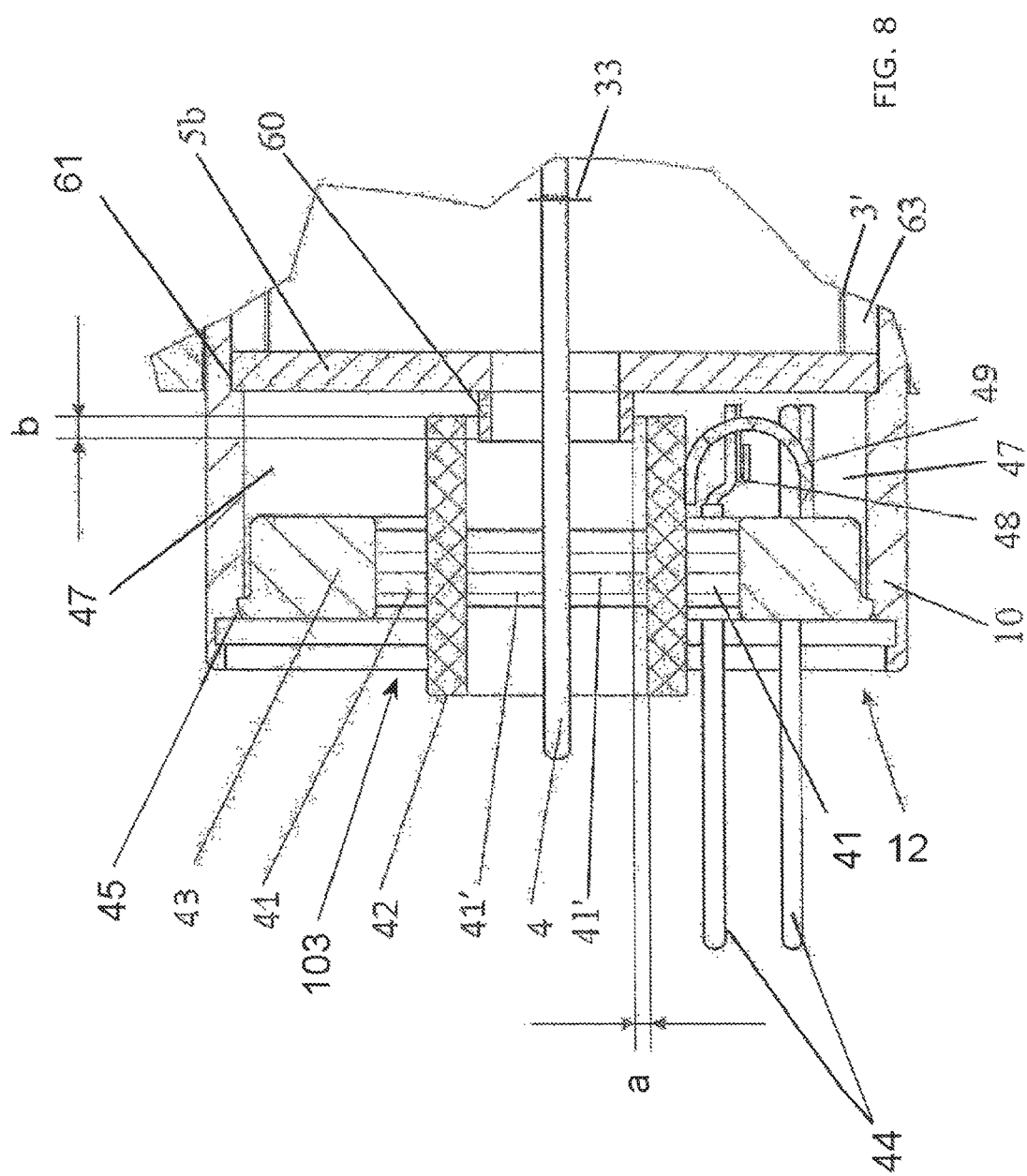
Figure 9:
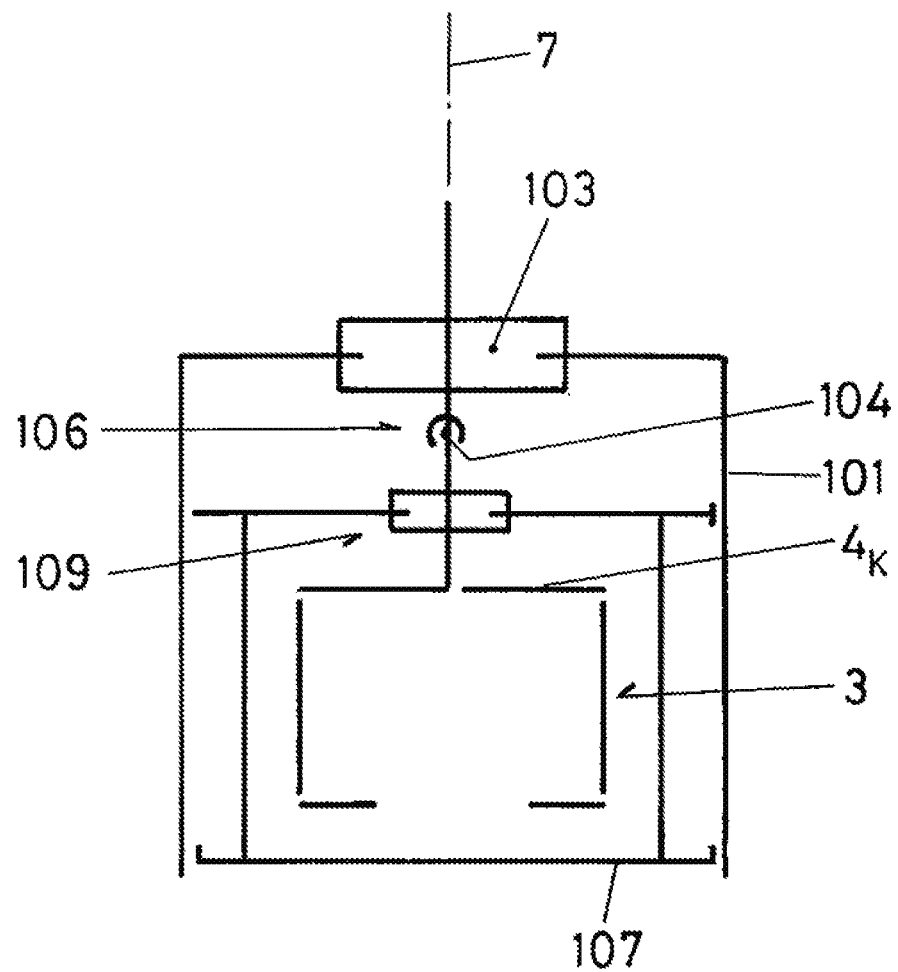

In the figures:

FIG. 1a shows in cross section, schematically and simplified, a first embodiment of a magnetron ionization vacuum measuring cell according to the invention having a ring magnet having axial magnetization, FIG. 1b shows, in an illustration similar to that of FIG. 1a, a further embodiment of a measuring cell according to the invention, namely a magnetron ionization vacuum measuring cell, having two ring magnets spaced apart from one another in the axial direction having radial magnetization, which are enclosed by an externally enclosing soft magnetic yoke, FIG. 1c shows, in an illustration similar to that of FIG. 1a, a further embodiment of a measuring cell according to the invention, namely a magnetron ionization vacuum measuring cell having two ring magnets having axial magnetization, which are polarized opposite to one another and are positioned abutting one another, FIG. 2a shows, in an illustration similar to that of FIG. 1a, a further embodiment of a measuring cell according to the invention, namely a magnetron ionization vacuum measuring cell having a ring magnet having radial magnetization and externally arranged, enclosing soft magnetic yoke, which has leg-type regions on both sides of the ring magnets and spaced apart therefrom, which each form a ring-shaped pole, which are oriented toward a first electrode, wherein a vacuum housing encloses and receives the entire arrangement of the measuring cell, FIG. 2b shows, in an illustration similar to that of FIG. 1a, a further embodiment of a measuring cell according to the invention, in which the vacuum housing is formed by the yoke itself, FIG. 2c shows, in an illustration similar to that of FIG. 1a, a further embodiment of a measuring cell according to the invention, in which the vacuum housing is arranged between the first electrode and the arrangement of the magnet system or the magnetization arrangement, such that the magnet system made of permanent magnet and yoke is located outside the vacuum chamber in the region of atmosphere, FIG. 2d shows, in an illustration similar to that of FIG. 1a, a further embodiment of a measuring cell according to the invention, in which the vacuum housing is simultaneously formed as the first electrode, such that the magnet system made of permanent magnet and yoke is located outside the vacuum chamber in the region of atmosphere, FIG. 2e shows, in an illustration similar to that of FIG. 1a, a further embodiment of a measuring cell according to the invention, in which the leg-like regions having the poles are guided in a curve toward the first electrode, FIG. 3 shows, in an illustration similar to that of FIG. 1a, a further embodiment of a measuring cell according to the invention, in which ferromagnetic guide means are arranged in the central region of the measuring cell above the poles of the yoke and/or the pole of the ring magnet, FIG. 4 shows, in an illustration similar to that of FIG. 1a, a further embodiment of a measuring cell according to the invention, in which the ring magnet and/or the ferromagnetic guide means associated with the pole is arranged asymmetrically and/or displaceably in the axial direction inside the arrangement of the yoke, FIG. 5a shows, in a top view, an illustration of a segment as part of an assembled ring magnet in which the magnetization direction is aligned perpendicularly to the chord of the segment, FIG. 5b shows, in a top view, an illustration of a segment as part of an assembled ring magnet having radially oriented magnetization direction, FIG. 5c shows, in a top view, a partial illustration of a ring magnet assembled from individual rod magnets, wherein the individual rod magnets are magnetized in the same direction, FIG. 6a shows, in an illustration similar to that of FIG. 1a, a further embodiment of a measuring cell according to the invention, in which two ring magnets, which are axially spaced apart from one another, are shown inside the arrangement of the yoke, FIG. 6b shows, in an illustration similar to that of FIG. 1a, a further embodiment of a measuring cell according to the invention, in which one further ring magnet having axial polarization is arranged in each case on both sides of the pole of the radially magnetized ring magnets and with opposite polarization to one another and oriented toward the axis inside the arrangement of the yoke, FIG. 7 shows, in cross section and greater detail, a further implementation of a vacuum measuring cell according to the invention, having a feedthrough having shielding device, FIG. 8 shows a detail illustration in cross section of the feedthrough region having the shielding device corresponding to FIG. 7, FIG. 9 shows, schematically and in simplified form, an ionization vacuum measuring cell, on which a measuring chamber is replaceable, and in which the electrically insulating, vacuum-tight feedthrough is practically completely covered, and therefore protected from contamination, with respect to the ionization chamber by a non-vacuum-tight feedthrough on the replaceable measuring chamber.

Figure 10:
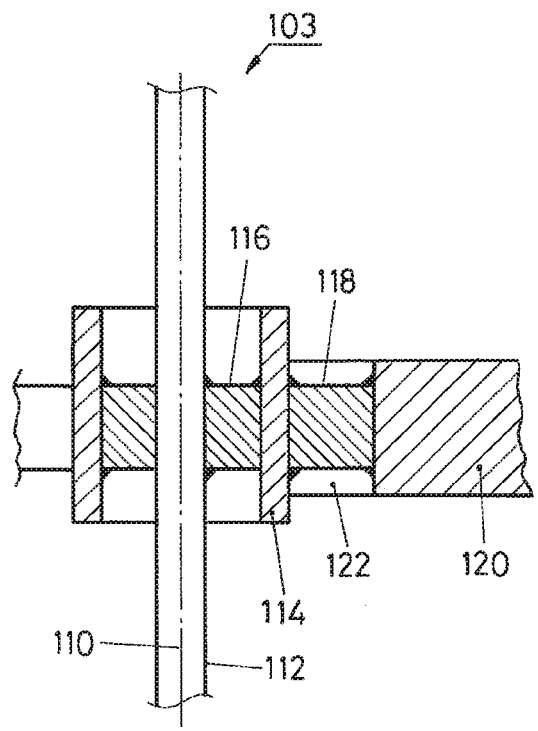
Figure 11:
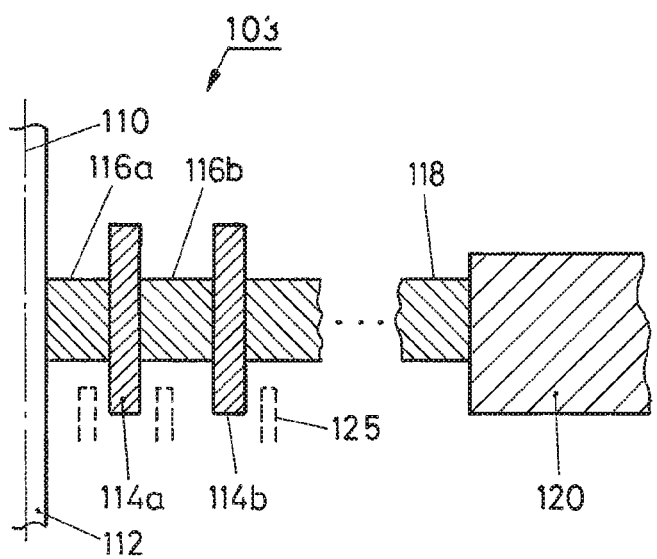
Figure 12:
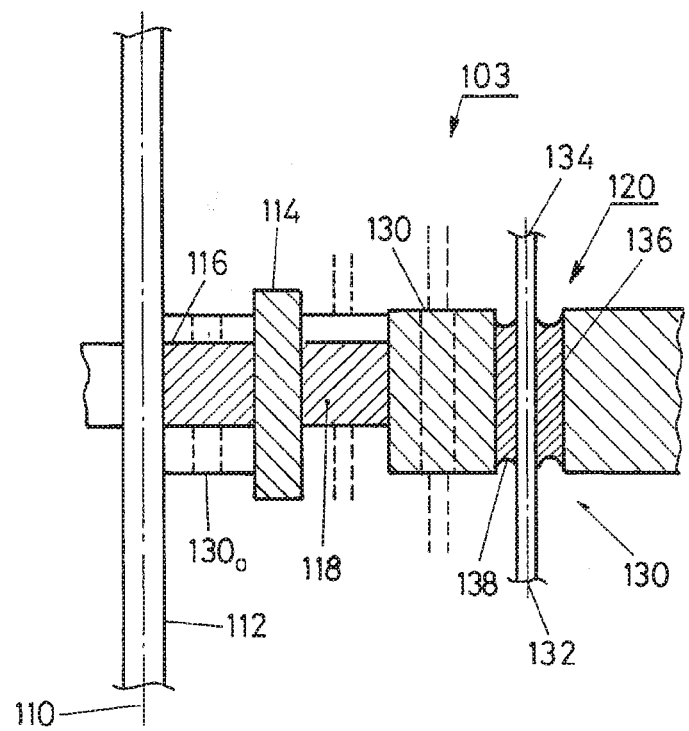
Figure 13:
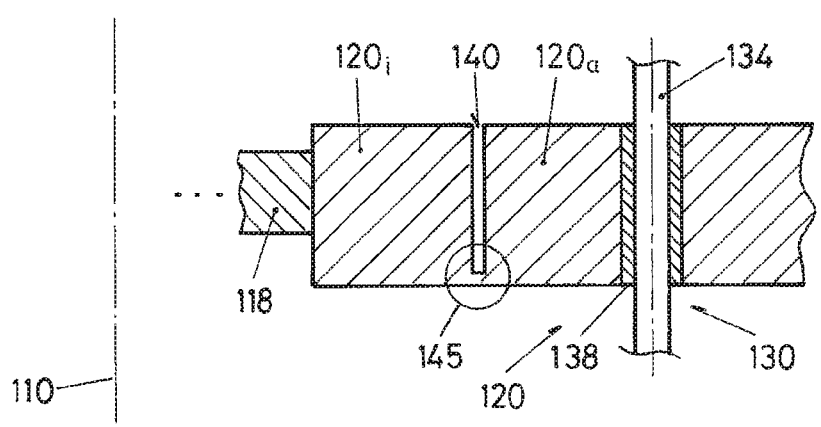
Figure 14:
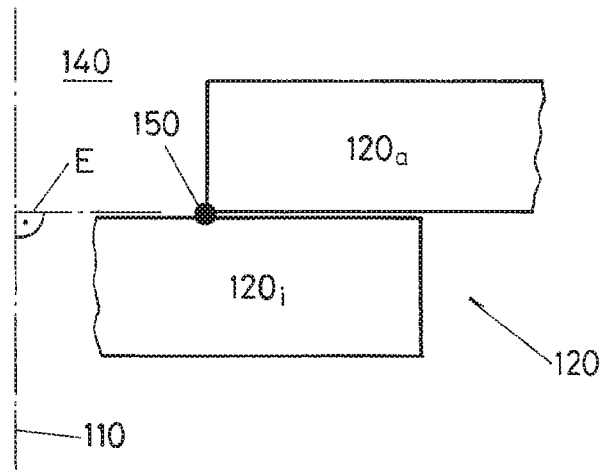
Figure 15:
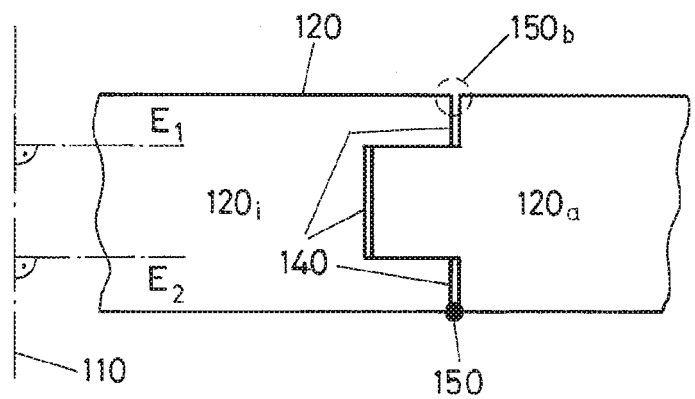
Figure 16:
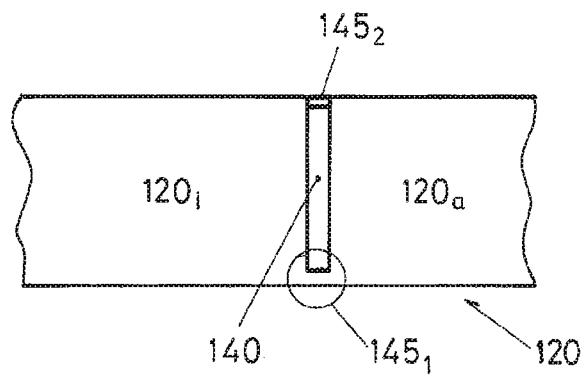
Figure 17:
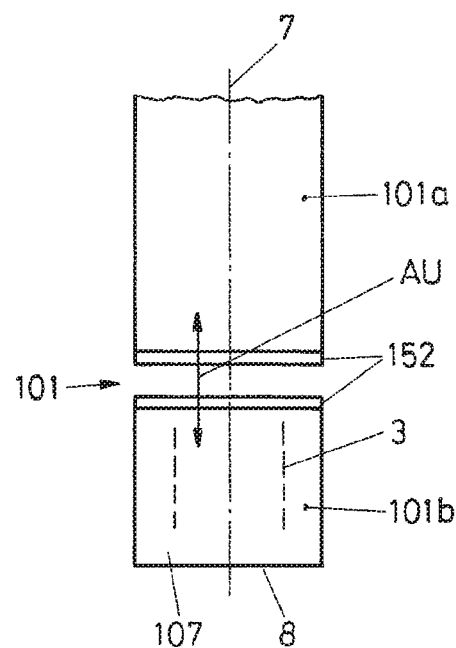
Figure 18:
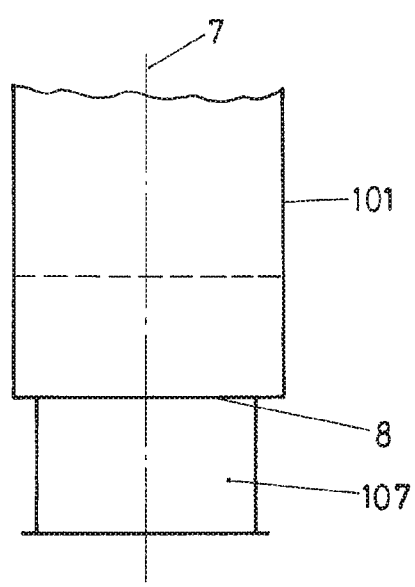

FIG. 10 shows, schematically and in simplified form, in a longitudinal section illustration, a part of the electrically insulating and vacuum-tight feedthrough, as used on the ionization vacuum measuring cells in the second aspect of the application, FIG. 11 shows, in an illustration similar to that of FIG. 10, a further embodiment of the mentioned electrically insulating and vacuum-tight feedthrough, FIG. 12 shows, on the basis of an illustration similar to that of FIGS. 10 and 11, the feedthrough, in which additional lateral feedthroughs are installed, FIG. 13 shows, schematically and in simplified form, originating from a feedthrough according to FIG. 12, a first embodiment of precautions to remedy or at least reduce impairments on the lateral feedthroughs according to FIG. 12 due to mechanical stresses, in particular thermally related, FIG. 14 shows, on the basis of a schematic illustration, a further embodiment of the precautions according to FIG. 13, FIG. 15 shows, in an illustration similar to that of FIG. 14, a further embodiment of the mentioned precautions, namely as mentioned, to reduce or even remedy impairments of the lateral feedthroughs according to FIG. 12 due to mechanical tensions, in particular thermally related, FIG. 16 shows a further embodiment of the mentioned precautions, in an illustration similar to that of FIG. 14 or 15, FIG. 17 shows, in simplified form and schematically, an ionization vacuum measuring cell, in which a measuring chamber having a housing part is formed as replaceable, according to the first aspect of the present application, FIG. 18 shows, in an illustration similar to that of FIG. 17, an ionization vacuum measuring cell, in which the measuring chamber is replaceable in a measuring cell housing by insertion or withdrawal, Using gas pressure measuring cells for vacuum measurement, which are based on the principle of a gas discharge using a cold cathode, is known. Such measuring cells are also referred to as cold cathode ionization vacuum meters or also as Penning cells. In such a measuring cell, a sufficiently high DC voltage is applied between two electrodes (anode, cathode), whereby a gas discharge can be ignited and maintained. The discharge current is then a measure of the pressure to be measured.

A magnetic field, formed in the region of the discharge section, guides the electrodes on their path from the negative electrode (cathode) to the positive electrode (anode) additionally on spiral paths, whereby the path of the electrons is lengthened. In this way, the hit probability with the gas particles is increased and the degree of ionization is improved. The discharge thus burns over broad pressure ranges and behaves in a stable and reproducible manner.

Vacuum measuring devices, which function on the principle of gas discharge using cold cathodes, can be coarsely divided into three classes, which differ above all in the configuration of the electrodes:

1. Penning Cell:

The anode is designed as a ring-shaped cylinder, which encloses the discharge space, wherein cathode plates are arranged on both end sides of the anode ring. The magnetic field lines extend in parallel to the axis of the anode ring.

2. Magnetron Cell:

The anode is designed as a hollow cylinder having a central axis and having the cathode arranged as a rod in the center or on the axis. The field lines of the electrical field accordingly extend radially. The magnetic field lines extend in parallel to the cylinder axis.

3. Cell Having Inverted Magnetron Arrangement.

The cylinder geometry is as in the magnetron cell, but having the anode as a rod-shaped arrangement in the center and the cathode as a hollow cylinder. The end sides of the cylinder are typically also at cathode potential. As in the magnetron, the magnetic field lines extend in parallel to the cylinder axis, and the field lines of the electrical field extend radially.

The space accessible to the gas to be measured inside an ionization vacuum measuring cell comprises a measuring chamber, within which the ionization space is established between anode and cathode. The interior of the measuring chamber can therefore, depending on the embodiment of the ionization vacuum measuring cell, be identical to the ionization space or can additionally comprise spatial regions to which the gas to be measured is applied, but the latter is not exposed to the ionization therein. The ionization space is, as mentioned, located between anode and cathode and, in inverted magnetron cells, is enclosed by the cathode, and in magnetron cells is enclosed by the anode.

The cell design which is used most common is that of the inverted magnetron, since it generally results in a more stable measurement signal than the Penning cell in high vacuum, the discharge ignites more easily at low pressures, and the lower measuring range for low pressures can be brought down into the range of $10^{-11}$ millibar.

The magnetic field required for maintaining the gas charge in the direction of the cylinder axis is generated in the measuring cells, because of the required field strengths in the order of magnitude of up to $10^{-1}$ T (=1000 Gauss), by permanent magnets, because the power consumption of electric magnets is excessively high and these would require a large construction. The following magnetic configurations are used for inverted magnetron cells:

A) Ring magnet having axial magnetization, as shown by the magnetization arrangement 105 on the schematic, simplified cell shown as an example according to FIG. 1a.

B) Two ring magnets having radial magnetization as shown by the magnetization arrangement 105 on the schematic, simplified cell shown as an example according to FIG. 1b.

C) Two ring magnets having axial magnetization, which have inverted polarity in relation to one another, as shown by the magnetization arrangement 105 on the schematic, simplified cell shown as an example according to FIG. 1c.

Variant (A) of the magnetization arrangement is the classic variant, having the advantage that such ring-shaped magnets 1 having axial magnetization are simple and cost-effective to produce.

In combination with suitable guide plates made of soft magnetic material, homogeneous useful field lines 14 and magnetic flux densities at the same time may therefore be achieved in the ionization space. The cathode 3 is, as already mentioned, designed as cylindrical and encloses the ionization space 20. The anode 4 is arranged on the axis of the cylindrical cathode 3. The entirety is enclosed by the ring-shaped permanent magnets 1 having axial polarity alignment in relation to the axis 7. In FIG. 1a, the north pole is identified with N and the south pole with S. The polarities can also be exchanged in each case within the arrangement. The cylindrical cathode can also have further electrode surfaces on the end side, oriented toward the axis 7, which are at the same potential and additionally reflect the electrons back into the ionization space 20. The ionization space has at least one opening, which communicates toward the outside with the vacuum space P to be measured. Such a measuring cell typically has a detachable flange connection, directly on the cathode 3 or on a housing 101 illustrated by dashed lines, within which the ionization space 20 having the electrodes 3 and 4 is located, and outside of which the permanent magnets 1 are arranged. The rod-shaped electrode 4 is guided by means of an electrically insulating, vacuum-tight feedthrough 103 into the ionization space 20. The feedthrough rides on the electrode 3 or on the housing 101.

On the ionization vacuum measuring cell according to FIG. 1a, the housing 101 or the cathode 3 itself forms a measuring chamber 107 inside the magnetization arrangement 105 having the permanent magnets 1. The measuring chamber 107 is designed as a replaceable component, and at the same time preferably so it cannot be disassembled further non-destructively. In any case, it comprises the cathode 3, and depending on its design also at least a part of the housing 101. Furthermore, the electrically insulating and vacuum-tight feedthrough 103 having the anode 4 can be part of the replaceable measuring chamber 107. Due to the replaceable embodiment of the mentioned measuring chamber 107, the measuring cell having the ionization space 20 can only be shut down briefly, for example, when cleaning of the measuring chamber becomes necessary, in that a replacement measuring chamber can be installed rapidly in the measuring cell.

The electrically insulating and vacuum-tight feedthrough 103 is advantageously formed both in the case of a measuring cell concept having replaceable measuring chamber 107 as well as in the case of a measuring cell concept having non-replaceable measuring chamber 107, as will be explained hereafter, fundamentally having a ceramic cylinder coaxial to the anode 4 and a glass ring, which is fused onto the anode 4 and the ceramic body. The outer surface of the mentioned ceramic cylinder is connected via a second glass ring to a metal fitting around the anode 4, according to FIG. 1a, for example, the cathode 3 and/or the housing 101. The cathode 3 is typically set at housing potential and therefore at reference potential, for example, ground potential of the measuring cell, but can also be operated electrically floating with respect to housing 101, whereby then a further vacuum-tight, electrically insulating feedthrough is required for setting the potential of the cathode 3.

Variant (B), according to FIG. 1b, has two radially magnetized magnet rings, which are spaced apart from one another in the axial direction, and which are connected via a ring-shaped yoke 2 of the magnetization arrangement 105 made of soft magnetic material, for the return of the magnetic circuit. In comparison to variant (A), variant (B) has smaller stray fields 15 toward the outside, in particular in the radial direction. A part of the generated magnetic field 15 closes outside the ionization space and forms a stray field 15 and this does not contribute to the useful field 14. Such external stray fields 15 are disadvantageous, since they can interfere with the devices and processes located there. Variant (B) having the smaller stray field 15 to the outside is therefore more advantageous in this regard. However, this also means that less permanent magnetic material has to be used for the same flux densities in the ionization space.

The statements made in conjunction with FIG. 1a apply with respect to the ability to replace the measuring chamber 107 and the design of the electrically insulating and vacuum-tight feedthrough 103. In FIG. 1b, the feedthrough 103 is part of the replaceable measuring chamber 107.

With respect to the design of the magnetization arrangement 105, according to the proposal of Lethbridge in EP 0 611 084 A1, ring segments, which generate a radially oriented field, can also be used instead of radially magnetized rings.

The magnetization arrangement according to variant C and FIG. 1c was proposed by Drubetsky & Taylor, U.S. Pat. No. 5,568,053. It results in a field which changes the direction with respect to the cylinder axis at the height between the two magnet rings. On the cylinder axis, the field is even zero in this region, because the flux densities of the two magnets mutually cancel out. The advantage of this arrangement is a lesser stray field in comparison to variant (A) at given flux density requirements in the ionization space 20. The stray field is always still noticeably present and can interfere, however, above all if a strong useful field is to be generated in the ionization space 20, because then the external stray field also correspondingly become stronger and enters the outside region again.

The statements made in conjunction with FIG. 1a apply with respect to the ability to replace the measuring chamber 107 and the design of the electrically insulating and vacuum-tight feedthrough 103. In FIG. 1c, the feedthrough is not part of the replaceable measuring chamber 107, unless it comprises a part of the housing 101 having the feedthrough 103.

A disadvantage of variant (A) are the relatively strong flux densities, which extend up to outside the ionization chamber 20, even the measuring chamber 107, and even the entire measuring cell arrangement and occur there as stray fields 15, as illustrated in FIG. 1a. This has disadvantageous effects on devices located in the vicinity and on processes which can take place in the immediate vicinity of the measuring cell in the case of typical use, in particular on processes which are operated using charge carriers or ionized gas.

Using variant (B), such stray fields 15 are reduced in that a magnetic connection is formed outside the ionization chamber 20 and outside the replaceable measuring chamber 107, between the two ring magnets 1, by arranging a guide plate 2 or a yoke made of soft magnetic material on the magnetization arrangement 105. However, significant interfering external stray fields 15 still form as a result of the magnetic parallel connection between the poles N, S in each of the two ring magnets 1, as shown in FIG. 1b.

In variant (C), the gas discharge is low due to the small magnetic flux density, which is no longer perpendicular to the electrical field axis, in the center at the height between the two magnet rings and accordingly a part of the ionization space 20 in the measuring chamber 107 remains unused. In addition, a non-negligible interfering stray field 15 results from the magnetic parallel connection on the outer side of the magnets, as shown in FIG. 1c, which acts somewhat similarly as was already explained above for variant (A), according to FIG. 1a.

Inverted magnetrons are frequently used in the coating industry, because they are robust. They do not have a filament, which can burn out or break due to impacts. Since magnetron arrangements enable a high degree of ionization, the problem of contamination of the surfaces freely exposed to the ionization space 20 also increasingly exists, due to increased atomization of material of such surfaces and redeposition. Therefore, an attempt is to be made to control the problem, in that inverted magnetrons are also to be constructed such that they can be modularly disassembled for cleaning as already stated.

Gases are split or activated by the plasma discharge. For example, hydrocarbons are cracked or polymerized via plasma-chemistry dissociation reactions. Coatings of the mentioned surfaces can also thus result. The measuring chamber is soiled. Since small currents in the range of $10^{-9}$ A are measured in this measurement method at low pressures, even a slight conductive soiling of the feedthrough 103 can already cause leakage currents, which corrupt the measurement or even make it impossible.

One example illustrates the problems of the required high level of electrical insulation on a feedthrough 103 of a cold cathode/anode arrangement. At a pressure of $10^{-9}$ millibar, the measuring current is typically $10^{-9}$ A. At an anode voltage of the order of magnitude of 1 kV, the leakage current will already have the same order of magnitude as the measuring current in the case of a good insulation resistance value of $10^{12}\Omega$.

As mentioned, wall material is also sputtered off by the operation. Flakes can arise, which, individually or in aggregate, can soil the electrically insulating and vacuum-tight feedthrough 103, enable leakage currents, or even produce short circuits, and can thus drastically restrict the usage duration of the measuring cell until cleaning is necessary.

The cleaning of the measuring cell, which is left integral or is to be disassembled into individual parts, can be very cumbersome and lengthy. This increases the usage costs. In addition, the calibration is typically no longer guaranteed after such cleaning, i.e., the cells have a greater measurement error.

However, if the measuring chamber 107, with or without at least a part of a housing 101 and/or with or without feedthrough 103, is directly replaceable as a component, as was mentioned, then already calibrated measuring chambers 107 can assume the operation of that to be cleaned in a short time.

Due to the more substantial ability to disassemble the measuring cell, higher production costs also arise, since a sealing system which can be disassembled must be used. A greater probability that leaks could arise after the disassembly also results. This is not the case with a replaceable measuring chamber 107, which is even conceived as a disposable part, and which can be designed as leak-tight and not able to be disassembled.

Reference can be made to U.S. Pat. No. 5,317,270 and EP 01 540 294 B1.

As already mentioned, the objects of the present invention, achieved individually thereon or in combination, include shortening shutdown times of the ionization vacuum measuring cell and/or providing a novel electrically insulated and vacuum-tight feedthrough, according to 103, which can be established in particular with relatively low manufacturing expenditure and, accordingly, in high quality with respect to insulation and sealing requirements, with relatively low manufacturing costs.

At the same time, a magnetization arrangement on the measuring cell is also to be proposed in good embodiment, which contains a magnetron arrangement and in which interfering magnetic fields outside the measuring cell are substantially reduced, or can even be essentially prevented. The measuring cell is to be able to detect a large pressure range to be measured and is to operate reliably and reproducibly. Furthermore, in a good design, it is to be compact and producible cost-effectively. The soiling arising in operation, for example, due to self-sputtering, cracking, and the like is not to result in long and/or frequent shutdown times of the measuring cell.

In consideration primarily of the magnetization arrangement on a measuring cell according to the invention presently implemented in the first and/or second aspect of the present invention, the following applies:

The measuring cell has:

a) a housing, which can be evacuated, having a measuring fitting for the vacuum to be measured, b) a first and a second electrodes, which are arranged essentially coaxially and spaced apart from one another, and having a common axis, whereby a measuring chamber is formed between these two electrodes, which is arranged communicating with the measuring fitting, wherein the first electrode forms the outer electrode and it is essentially has a cylindrical surface, and the second electrode is designed rod-shaped and is located on the axis, c) an electrically insulating vacuum-tight feedthrough arranged on one end of the housing on the side opposite to the measuring fitting, wherein it has an insulator arranged about the axis and the second rod-shaped electrode is guided through this insulator to form a seal, d) a voltage source, which is connected to the electrodes, e) a current measuring means for analyzing a discharge current formed between the electrodes, wherein this forms a function of the vacuum pressure to be measured, f) at least one permanent magnet ring, which encloses the coaxial arrangement of the electrodes, having magnetization direction aligned essentially radially in relation to the axis and having a ferromagnetic yoke enclosing this permanent magnet ring, wherein:

the yoke is guided away from the permanent magnet ring in the axial direction on both sides and guided after a predefined distance from the permanent magnet ring on both sides in the radial direction toward the axis and the first electrode, wherein this first electrode forms the outer electrode of the coaxial arrangement of the electrodes, such that the yoke forms two ring-shaped poles on both sides and spaced apart from the permanent magnet ring, via which at least a part of the field lines of the permanent magnet ring close inside the measuring chamber, while penetrating the first electrode, wherein a ring-shaped tunnel-type magnetic field is formed around the axis at least partially via the first electrode inside the measuring chamber, and disk-shaped ferromagnetic guide means are arranged in the radial direction, oriented toward the axis, in the region of at least one of the internal poles of the yoke, which are formed as the first and second pole disks and the center of which has an opening in each case around the axis for guiding through the second electrode and for the measuring gas passage, wherein a shielding device is arranged between the feedthrough and the second pole disk facing toward it in the radial region of the insulator and coaxially to the axis to protect the insulator from contamination by atomized particles from the measuring chamber, which forms an ionization space.

On this cell, the measuring chamber is, according to the invention—aspect 1—replaceable and/or the electrically insulating and vacuum-tight feedthrough is designed according to the invention—aspect 2.

The mentioned magnetization arrangement forms a magnetron. In certain cases, the first, outer electrode can be operated as the anode, wherein the second, inner electrode is operated as the cathode. However, the greatly preferred arrangement forms an inverted magnetron. In this case, the outer, first electrode is operated as the cathode and the inner electrode, which is coaxial thereto, is operated as the anode. In this arrangement, referred to as an inverted magnetron, the discharge efficiency is substantially better and more stable. The anode, which is preferably arranged in the center, is preferably designed rod-shaped.

The magnetization arrangement always has soft magnetic material outside the measuring chamber. The magnetic connection on both sides between the poles extends via the soft magnetic material. The magnetization arrangement is therefore prevented from generating an interfering stray field toward the outside, or such a field is at least minimized. Inside the ionization space, in contrast, at least two ring-shaped, tunnel-type magnetic field configurations, which are oriented inward, form via the area of the first electrode, each having an axial component. The field lines go inward from the inner pole of the at least one permanent magnet and penetrate the first electrode, wherein they close on both sides of the magnet via the poles of the soft magnetic or ferromagnetic yoke, in that they again penetrate the first electrode. In this case, the field lines change the direction at the height of the magnet inside the ionization space, whereby the two adjacent tunnel-type fields extend opposite in their polarity. At least two ring-shaped, toroidal discharges, which are located adjacent to one another, thus arise via the first electrode. The electrons rotating therein oscillate, viewed in cross section, laterally back and forth along the field lines and rotate in a circle inside the rings in opposite directions and cause a high degree of ionization due to the dwell time, which is thus extended.

To ensure good insulation and vacuum tightness on the feedthrough 103, it is constructed by a glass/ceramic composite.

In addition to an inner glass ring of the feedthrough, an adjoining ceramic cylinder is provided thereon, whereby the leakage path can be lengthened efficiently and cost-effectively. The feedthrough in the anode region must be able to withstand up to 5 kV, which approximately represents the highest anode voltage in operation. Since, in the lower measurement range end of a measuring cell, typically at $10^{-9}$ millibar, the ionization current is in the range of $10^{-10}$ to $10^{-9}$ A, the insulation resistance must assume values in the range of $10^{13}$ ohm, so that the leakage current does not restrict the sensitivity of the measuring cell with respect to the measuring current.

The measuring cell as described above, additionally having the precautions in the first and/or second aspects of the application, enables the measuring chamber to be heated up to at least 150° C. or even up to 250° C. An overpressure is permissible up to 10 bar and the leakage rate is less than 1E-9 millibar 1/s.

The feedthrough comprises, as the metal fitting, a metal ring, preferably made of stainless steel, in particular made of non-magnetic stainless steel (1.4435, AISI 316 L). The ring particularly preferably consists of Hastelloy. Hastelloy C-22 (NiCr2 1 Mol 4W, 2.4602) is a nickel-chromium-molybdenum-tungsten alloy. It is very corrosion-resistant with excellent welding properties.

Hastelloy B3 (NiMo29Cr, 2.4600) is a nickel-molybdenum alloy having very good resistance to nitric acid and other acids. Both Hastelloys are non-magnetic.

The insulator of the feedthrough consists of the mentioned glass/ceramic composite. The glass preferably has an adapted coefficient of thermal expansion, such as a Covar Schott 8250 or BH-7 Nippon glass. The ceramic cylinder preferably consists of Al2O3. This ceramic surprisingly enables the increase of the electrical insulation strength beyond that of the glass. The part of the ceramic cylinder protruding beyond the glass insulator is to be at least as long as the leakage path along the glass ring or longer, to thus sufficiently extend the leakage path and thus reduce the leakage current. In the center of the feedthrough, the rod-shaped anode is fused with a glass of the glass ring to form a seal, fed through, and fixed. The diameter of the anode is 1 mm, for example. It preferably consists of Hastelloy C22.

In addition, still further feedthrough pins can be arranged on the periphery of the feedthrough, i.e., through the metal fitting. They are used for conducting through electrical signals to and/or from auxiliary sensors which are optionally arranged in the housing of the measuring cell, such as Pirani or membrane pressure sensors, for example, capacitive membrane pressure sensors, or are used for setting the potential of the cathode. They advantageously also act as a support for the structure of auxiliary sensors. Such sensors can be particularly advantageously arranged directly in a ring-shaped cavity, adjacent to the feedthrough and the protruding ceramic cylinder, in the measuring cell according to the invention under both aspects of the present application.

The measuring cell in the presently conceived type is supplemented in that, around the central opening of the second pole disk in the direction of the feedthrough, at least one second cylinder is arranged coaxially to the axis, which protrudes into the ceramic cylinder with an overlap, wherein the two cylinders are spaced apart from one another in the region of the overlap such that they do not touch and a gap is formed in the radial direction. In this way, the path for atomized particles from the ionization space is lengthened, on the one hand, and the insulators of the feedthrough are shielded, on the other hand. A substantial shielding effect thus results, which substantially reduces and delays the coating or contamination of the insulator surfaces on the feedthrough. In addition to the provided basic design having a pair of cylinders, additional or multiple cylinders can also be used on only one of the sides or on both sides, which engage in one another in a manner spaced apart from one another, whereby the path of the labyrinth is further lengthened and the shading effect can be additionally improved.

In one embodiment of the invention in the first and/or second aspects, the cathode electrode is designed as a separate tube part or cylinder, for example, in the form of sheet metal, which is held spaced apart from the inner wall of a housing (see 101) by the pole disks arranged on both sides on the tube part, wherein a gap-shaped line is formed laterally between the housing and the tube part and the measuring chamber (see 107) is thus enclosed. The pole disks have webs on their periphery around the circumference, which enable the measuring gas to be conducted from the measuring inlet via the gap up to the feedthrough. This arrangement also forms an embodiment of a replaceable measuring chamber according to the invention, which can be replaced and exchanged easily when the soiling of the measuring chamber becomes excessively great. The replaceable measuring chamber can also be manufactured from different materials, depending on the usage of the measuring cell in different processes. For example, the cathode in the replaceable measuring chamber can be manufactured from titanium plate. Undesired gases can be bound or pumped away by way of the properties of the sputtered-off titanium. The pump effect can optionally be taken into consideration in the firmware for the calibration of the measuring cell.

We will now turn to the further figures and examples.

An embodiment of an ionization vacuum measuring cell 30 having a magnetron magnetization arrangement 105 is shown schematically, in simplified form, and in cross section as an example in FIG. 2a.

A housing 101 has a measuring fitting 8 and this can be connected to the vacuum to be measured, whereby the housing 101 is accordingly evacuated. The connection between this housing 101 and the container having the vacuum to be measured can be produced, for example, via a sealing flange 11. The vacuum measuring cell 30 comprises the housing 101, having two electrodes 3, 4 and a magnetization arrangement 105, wherein the housing 101 encloses them in the present embodiment. The magnetization arrangement 105 contains a permanent magnet ring 1 and a yoke 2 made of ferromagnetic material. The ferromagnetic material can comprise both metallic materials (ferromagnetic) as well as ceramic materials, for example, ferrite.

The first electrode 3 and a second electrode 4 are arranged essentially coaxially and spaced apart from one another and have a common axis 7. In this way, the ionization space 20 is formed between these two electrodes. This space is in turn arranged communicating with the measuring fitting 8. The first electrode 3 forms the outer electrode and essentially has a cylindrical surface. The second electrode 4 can also be designed as cylindrical or rod-shaped, and is advantageously arranged in the center, located on the axis 7.

Both electrodes can be electrically supplied via vacuum-tight, electrical feedthroughs 105A, 105K on the housing 101. For this purpose, a voltage source is connected to the electrodes 2, 3. Current measuring means 17 are used for analyzing a discharge current, the discharge, which is formed between the electrodes 3, 4. This discharge current corresponds to a function of the vacuum pressure to be measured and is electronically analyzed and supplied for further use. At least one permanent magnet ring 1 encloses the coaxial arrangement of the electrodes 3, 4 having magnetization direction 13 aligned essentially radially in relation to the axis. This permanent magnet ring 1 is furthermore enclosed by a yoke 2, which consists of ferromagnetic material for guiding the magnetic field. The yoke 2 is guided away from the permanent magnet ring 1 on both sides in the axial direction and, after a predefined distance d from the permanent magnet ring 1, is guided on both sides in the radial direction toward the axis 7 and the first electrode 3. A type of U-shaped yoke thus results in cross section, which forms poles 9a and 9b on both sides and spaced apart from the permanent magnet ring 1. In this case, the first electrode 3 is the outer electrode of the coaxial arrangement of the electrodes 3, 4. At least a part of the field lines of the permanent magnet 1, the useful field lines 14 which are decisive for the discharge, therefore close via the pole of the permanent magnet ring 1 and the respective pole 9a, 9b of the yoke 2 inside the ionization space 20, penetrating the first electrode 3, wherein preferably a ring-shaped tunnel-type magnetic field 14 is formed via the first electrode 3 inside the ionization space 20. In the arrangement according to FIG. 2a, a tunnel-type magnetic field 14 is formed in each case on both sides of the permanent magnet ring 1, i.e., two ring-shaped or toroidal magnetic fields 14 having opposing polarity of the field line profile.

The outer first electrode 3 is preferably operated as the cathode and the inner second electrode 4 is preferably operated as the anode.

The permanent magnet ring 1 is magnetized in the radial direction and preferably contains magnetic material of the group of rare earth elements, such as neodymium, samarium, etc. To simplify the production, the ring can also be assembled from individual parts, for example, from segments and/or individual rectangular magnets, which are then concatenated in a ring shape, as shown in FIGS. 5a to 5c. The magnetization is performed in the indicated arrow direction, in the case of the segment of FIG. 5a in uniform direction or in the case of the segment of FIG. 5b in the radial direction. In the case of FIG. 5c, individual, for example, rectangular magnets are concatenated in a ring shape. The length h is then preferably longer than the width in the individual piece. The thickness of the magnetic ring 1 is preferably not greater than the width h.

The shape of the U-shaped yoke 2 is formed at least partially angled in the sectional plane in which the axis 7 is located, such that in the axial direction at the distance d on both sides of the permanent magnet ring 1, the legs of the yoke 2 thus resulting point in the radial direction toward the axis 7 of the measuring cell 30 and each form a ring-shaped pole 9a, 9b on both sides therein, which is guided toward the first electrode 3. The angling is preferably designed as perpendicular, as shown in FIGS. 2a to 2d, 3, 4, 6. The poles 9a, 9b of the yoke and the inner pole of the permanent magnet ring are preferably spaced apart equally in relation to the axis 7. However, in certain cases they can be offset in relation to one another, as shown, for example, in FIG. 2b. For example, one pole 9b of the yoke 2, in the lower region, is guided therein toward the axis 7. It is advantageous if all poles are arranged located as close as possible in the region of the first electrode 3, to be able to guide and use the magnetic field optimally. The poles 9a, 9b of the yoke are preferably arranged such that the magnetic field 14 passes through the first electrode 3 therein. The magnetic useful field 14 therefore leads away from the pole of the permanent magnet ring 1 through the first electrode 3 and closes in an arc shape inside the ionization space 20 via the two poles 9a, 9b of the yoke 2, in that it is again guided therein through the first electrode 3. The guiding of the magnetic field to the first electrode 3 results in a high efficiency of the discharge. In certain cases, one or both poles 9a, 9b of the yoke 2 can also be arranged such that the field lines 14 pass only partially or not at all through the first electrode 3, as is shown, for example, in FIG. 2b in the upper region for one pole 9a. In the lower part of FIG. 2b, the yoke 2 is angled toward the axis, such that the field lines 14 also pass through the first electrode 3 again therein. It is advantageous if this angling is performed on both sides of the cylindrical first electrode 3. In this case, the first electrode 3 forms a type of closed cylinder, which only still has one opening 8 for the supply of the measuring gas P and optionally means for mounting the second electrode inside this cylinder using an electric, optionally also vacuum-tight feedthrough for supplying the second electrode. In addition to the angled design of the yoke 2, at least parts thereof can also be guided at least partially in an arc shape in the radial direction toward the first axis 7 or toward the electrode 3, as shown in FIG. 2e.

In the example shown in FIG. 2a, the elements of the measuring cell 30, the magnetization arrangement, and the two electrodes 3, 4 are enclosed by the vacuum-tight housing 101. This housing 101 has an opening 8 and a fitting 11, preferably designed as a flange, whereby the measuring cell 30 can be connected to form a seal, while communicating with the vacuum volume to be measured.

In the embodiment according to FIG. 2a, as mentioned, the housing 101 encloses the magnetization system 105. The replaceable measuring chamber 107 is therefore radially delimited here by the electrode 3 with respect to the axis 7. To replace this measuring chamber 107, the interior of which essentially corresponds to the ionization space 20, the electrically insulating and vacuum-tight feedthrough $103_A$ having the electrode 4 is left on the housing 101, which does not form part of the replaceable measuring chamber 107. In a further embodiment (not shown here), the electrode 4 and the electrically insulating and vacuum-tight feedthrough corresponding to $103_A$ is also designed as replaceable with the measuring chamber 107, in that the mentioned feedthrough is fastened on the electrode 3, and not on the housing 101. As shown in FIG. 2a, the opening 8 of the housing 101 is designed to be sufficiently large that the measuring chamber 107 can be replaced through the opening 8. Otherwise, and if the opening is designed as shown in FIG. 2b, for example, it is readily possible, as shown in FIG. 2b by dot-dash lines, to screw the flange 11 in a detachable manner as the housing part $101_a$ on the remaining housing 101 and to remove it, to replace or exchange the measuring chamber 107.

A further possible design of the measuring cell 30 having the housing 101 is shown in FIG. 2b. In this case, the yoke 2 of the magnetization arrangement 105 is simultaneously designed as the vacuum-tight housing 101 having connecting means 11 arranged thereon. The yoke 2 can also only be part of the housing 101. In this case, the housing 101 can be produced in part from soft magnetic or ferromagnetic material and in another part from nonmagnetic material, for example, from inox.

The replaceable measuring chamber is also radially delimited on the outside here by the electrode 3. The feedthrough 103A is, with the electrode 4, part of the replaceable measuring chamber 107.

In a further variant, according to FIG. 2c, the housing 101 can be arranged between the first electrode 3 and the magnetization arrangement 105, such that the magnetization arrangement 105 comes to rest entirely outside the vacuum-enclosing housing 101. This has the advantage that the materials of the magnetization arrangement 105 cannot soil or contaminate the ionization space 20, whereby the measuring result could be disadvantageously influenced.

The replaceable measuring chamber 107 is radially delimited on the outside here by the housing 101, or at least a part thereof. The feedthrough 103A rides on the housing 101, whereby the electrode 4 and the feedthrough 103A, however with the housing 101, are also part of the replaceable measuring chamber 107 here.

The variant according to FIG. 2d shows that the first electrode 3 can simultaneously also be designed as a vacuum-tight housing 101. This also enables the magnetization arrangement 105 to be separated from the ionization space 20 in vacuum technology, and additionally a compact, simple embodiment of the measuring cell 30. The permanent magnet ring 1 can be arranged asymmetrically inside the yoke 2 between the legs thereof having the two poles 9a, 9b in the axial direction or even so it is displaceable, as is shown in FIG. 4 by the arrows 18, which indicate the movement direction. The properties of the magnetization arrangement 105 and therefore the discharge can hereby be intentionally influenced or also irregularities can be corrected. In most preferred cases, the permanent magnet ring 1 is arranged centrally in relation to the poles 9a, 9b of the yoke 2, so that the poles 9a, 9b of the yoke 2 are arranged symmetrically in relation to the permanent magnet ring 1. The replaceable measuring chamber 107 in FIG. 2d is radially delimited on the outside by the electrode 3. The feedthrough 103A rides on the electrode, whereby the electrode 4 and the feedthrough 103A are also part of the replaceable measuring chamber 107 here.

The magnetic field, which is oriented inward, originating from the poles, can be influenced using additional guide means, to further optimize the discharge. For example, ferromagnetic guide means 6 can be arranged in the radial direction, oriented toward the axis 7, in the region of the inner pole of the permanent magnet ring (1), as shown in FIGS. 3 and 4. Ferromagnetic guide means 5a, 5b can also be arranged, for example, oriented toward the axis 7 in the radial direction, in the region of at least one of the inner poles 9a, 9b of the yoke 2. Such guide means can be manufactured as sheet-metal parts or plate-type parts from soft magnetic or ferromagnetic material, which are designed as disk-shaped, for example. Openings are provided therein as needed, to guide through the second electrode 4 and/or to enable the gas exchange.

If one compares the illustration of FIG. 3 to the embodiment of the electrode 3 according to FIG. 1c, it is immediately apparent that the ferromagnetic guide means 5a or 5b can readily form the end parts of the electrode 3 formed according to FIG. 1c, because such guide means 5a and 5b do not lose their conductivity with respect to the magnetic field by being set to the electrical potential of the electrode 3.

This also applies for the guide means 6 shown in FIG. 3. They can also be readily installed on the electrode 3.

Therefore, however, these guide means 5a, 5b, and/or 6 can be part of the replaceable measuring chamber 107, in that they are replaced with the mentioned one electrode 3, which is also part of the mentioned replaceable measuring chamber 107.

A further embodiment of the magnetization arrangement 105 is shown in FIG. 6a, in which two permanent magnet rings 1, spaced apart from one another and with opposite polarization, are arranged inside the yoke 2. This arrangement generates a particularly powerful ring-shaped magnetron field between the two poles of the permanent magnet rings 1 via the first electrode 3 inside the ionization space 20. A further ring-shaped field then extends in each case on both sides thereto, which is terminated by the two poles 9a, 9b of the yoke 2, and thus stray fields exiting outward can be prevented. It is readily also possible if needed to use more than two permanent magnet rings 1, the poles of which are each arranged alternately, although two permanent magnet rings 1 are preferred.

The replaceable measuring chamber 107 in FIG. 6a is delimited radially on the outside by the electrode 3. The feedthrough 103 rides on the electrode 3, whereby the electrode 4 and the feedthrough 103 are also part of the replaceable measuring chamber 107 here.

A further embodiment of the magnetization arrangement 105 is shown in FIG. 6b.

A further ring magnet 21a, 21b, which is magnetized in the axial direction and which is arranged inside the magnet system in the region toward the axis 7, is arranged in each case between the legs and the poles 9a, 9b of the yoke 2 and the permanent magnet ring 1. The thickness of the magnet ring 21 in the radial direction is preferably at most half of the width h of the permanent magnet ring 1. Very high flux densities of the magnetic field tunnel via the first electrode 3 can be achieved using this arrangement. Of course, such a ring magnet 21 can advantageously also be arranged between two permanent magnet rings 1, corresponding to the above-described embodiment according to FIG. 6a.

The replaceable measuring chamber 107 in FIG. 6b is delimited radially on the outside by the electrode 3. The feedthrough 103 rides on the electrode 103, whereby the electrode 4 and the feedthrough 103 are also part of the replaceable measuring chamber 107 here.

All feedthroughs 103 in the embodiments according to FIGS. 1a to 6b can, even without replaceable measuring chamber 107, be designed according to the invention, in that the feedthroughs 105, as described hereafter, are then designed as metal/glass/ceramic/glass composite feedthroughs of the above described type. However, the embodiments having replaceable measuring chamber is 107 can readily also be combined with the feedthroughs designed as mentioned.

The measuring cells 30 described up to this point are operated, for example, using a voltage of 3.3 kV between the two electrodes 3, 4, i.e., between cathode 3 and anode 4. The preferred range for the operation of the measuring cell 30 is between 2.0 kV and 4.5 kV.

Dimensions are specified hereafter for the important parts.

The Second Electrode 4 (Anode):
Length of the anode inside the measuring chamber: for example, 20 mm, with the preferred range from 10 to 30 mm.
Diameter of the anode: for example, 1.0 to 1.5 mm, with the preferred range from 1.0 to 5.0 mm.
Material: nonmagnetic (also paramagnetic or diamagnetic).

The First Electrode 3 (Cathode):
Length of the cathode: for example, 20 mm, with the preferred range from 10 to 30 mm.
Diameter of the cathode: for example, 20 to 25 mm, with the preferred range from 15 to 35 mm.
Material: nonmagnetic (also paramagnetic or diamagnetic).

The Permanent Magnet Ring 1:
Height in the axial direction: for example, 5.0 mm, with the preferred range from 3.0 to 10 mm.
Width h in the radial direction: for example, 5.0 mm, with the preferred range from 3.0 to 10 mm.

Dimensions of the Entire Measuring Cell (External Dimensions):
Length of the measuring cell (without electrical terminals): for example, 54 mm, with the preferred range from 25 to 70 mm.
Diameter of the measuring cell: for example, 30 to 50 mm, with the preferred range from 25 to 80 mm.

Magnetic Field:
The flux density of the cylinder axis, measured inside the measuring chamber in the axial direction, is in the range from 10 mT (millitesla) to 300 mT, preferably in the range from 60 to 130 mT.

Stray Field 15:
Less than 2.0 mT at a distance of 30 mm in the radial direction from the outer edge of the measuring cell 30, preferably less than 0.5 mT.

Less than 2.0 mT at a distance of 30 mm in the radial direction from the front or rear edge in the axial direction of the measuring cell 30, preferably less than 0.5 mT.

The stray field cannot reach zero values as the lowest values in both cases. These lowest achievable limiting values are, in the most favorable case, at lowest approximately 0.01 mT, corresponding to 0.1 Gauss, which is approximately in the order of magnitude of the Earth's magnetic field measured at the Earth's surface.

It has been shown that in the case of the high magnetization power of the present magnetron—cold cathode—vacuum measuring cell, more material is also atomized from the electrode surfaces. Good protection of the insulators of the feedthrough 103 from covering by such atomized material particles is therefore particularly important.

It is particularly advantageous, as already mentioned multiple times, if the first electrode, the cathode, is designed as part of a replaceable measuring chamber, which can be easily installed, for example, on the measuring fitting side in or on the remaining part of the measuring cell, for example, is insertable, and therefore forms a replaceable unit. The replacement is performed when a specific undesired degree of soiling exists, which undesirably worsens the measurement accuracy or the reliable operation of the measuring cell is no longer ensured.

A measuring cell according to the invention in an embodiment variant will now be described in greater detail on the basis of FIGS. 7 and 8.

It comprises:

a) a housing 101, which can be evacuated, having a measuring fitting 8 for the vacuum to be measured, b) a first and a second electrodes 3, 4, which are arranged essentially coaxially and spaced apart from one another, and having a common axis 7, whereby the ionization space 20 is formed between these two electrodes, which is arranged communicating with the measuring fitting 8, wherein the first electrode 3 forms the outer electrode and it essentially has a cylindrical surface, and the second electrode 4 is designed rod-shaped and is located on the axis 7, c) an electrically insulating vacuum-tight feedthrough 103 arranged on one end of the housing 101 on the side opposite to the measuring fitting 8, wherein it has an insulator 41, 41' arranged about the axis 7 and the second rod-shaped electrode 4 is guided through this insulator to form a seal, d) at least one permanent magnet ring 1, which encloses the coaxial arrangement of the electrodes 3, 4, having magnetization direction 13 aligned essentially radially in relation to the axis and having a ferromagnetic yoke 2 enclosing this permanent magnet ring 1, wherein the yoke (2) is guided away from the permanent magnet ring 1 in the axial direction on both sides and guided after a predefined distance d from the permanent magnet ring 1 on both sides in the radial direction toward the axis 7 and the first electrode 3, wherein this first electrode 3 forms the outer electrode of the coaxial arrangement of the electrodes 3, 4, such that the yoke 2 forms two ring-shaped poles 9a, b on both sides and spaced apart from the permanent magnet ring 1, via which at least a part of the field lines of the permanent magnet ring 1 close inside the ionization space 20, while penetrating the first electrode 3, wherein a ring-shaped tunnel-type magnetic field is formed around the axis 7 at least partially via the first electrode 3 inside the ionization space 20, and disk-shaped ferromagnetic guide means 5a, 5b are arranged in the radial direction, oriented toward the axis, in the region of at least one of the internal poles 9 a, b of the yoke 2, which are formed as the first and second pole disks 5a, 5b and the center of which has an opening 31, 31" in each case around the axis 7 for guiding through the second electrode and for the measuring gas passage, wherein a shielding device 42, 60 is arranged between the feedthrough 103 and the second pole disk 5b facing toward it in the radial region of the insulator 41, 41' and coaxially to the axis to protect the insulator 41, 41' from contamination by atomized particles from the ionization space 20.

It is recognizable from FIG. 7 (see also FIGS. 3 and 4) that the guide means 5a, 6, and 5b are connected to the electrode 3 and also form the measuring chamber 107. It is removable or replaceable as a component with respect to the housing 101 by withdrawal through the measuring fitting 8, wherein the electrode 4 having the feedthrough 103 rides on the housing 101 and therefore, in this embodiment, is not part of the replaceable measuring chamber 107. The measuring chamber 107 is mounted so it can be withdrawn itself by action of the magnetization arrangement, including the plate-shaped guide means or pole disks 5a, 5b, 6, on the measuring chamber 107, in the housing 101, wherein, as shown in FIG. 7, a snap ring 68 can additionally be provided, to block the positioning of the inserted measuring chamber 107 in the housing 101.

The cylinder 42 acting as a shield, which also acts as an insulator, is a ceramic cylinder on the feedthrough 103. The insulator 41' is a glass ring, which is fused with the cylindrical inner surface of the ceramic cylinder 42 on the one hand and with the electrode 4 on the other hand.

The insulator 41 is a second glass ring, which is fused with the cylindrical outer surface of the ceramic cylinder 42 on one side, and with a metal fitting 43, which is designed as a ring, or the inner surface of an opening provided therein, which is coaxial to the axis, on the other side. Therefore, the invention is implemented in combined form under both aspects 1 and 2 in the measuring cell according to the invention shown in FIG. 7.

The signal analysis on the measuring cell according to FIG. 7 is performed in that a voltage source 16 is connected to the electrodes 3, 4, wherein the discharge current is analyzed using current measuring means 17, the discharge being formed between the electrodes 3, 4. This measured discharge current forms a function of the vacuum pressure to be measured.

On both sides of the permanent magnet ring 1, magnet holders 70 can be arranged opposite to the yoke 2, to hold the permanent magnet ring 1 precisely in position. This arrangement having permanent magnet ring 1, yoke 2, and magnet holder 70 can also be designed as a module, which can simply be pushed over the tubular housing 101. A shoulder as a stop for the positioning can be provided accordingly for this purpose on the outer circumference of the housing 101. As mentioned, the ionization space 20 or the replaceable measuring chamber 107 are advantageously delimited on the end side and spaced apart from one another in the axial direction 7 using a first and a second pole disk 5a, 5b on both sides in the length. These pole disks are each arranged in the region of the two poles 9a, 9b of the yoke 2, wherein optionally the inner wall of the tubular housing 101 directly, as the electrode 3, or an additionally inserted cylindrical electrode body along the inner wall of the housing 101, encloses the ionization space 20 and laterally delimits it.

If the inner wall of the housing 101 forms the electrode 3, it is advantageous to conceive the axial section of the housing which forms the electrode as part of the replaceable measuring chamber 107, for example, by way of axial screw connections at the points S indicated by dot-dash lines in FIG. 7.

The first 5a and the second pole disk 5b together with the first electrode 3, 3', which enclose the axis 7 having the second electrode spaced apart therefrom, form and therefore delimit the measuring chamber 107. A further pole disk 6 is advantageously provided in the region of the pole of the permanent magnet ring 1. The measuring chamber 107 is thus divided into two ionization spaces 20, 20'. It is advantageous if the division is performed such that the third pole disk 6 and the permanent magnet are arranged centrally, whereby the two ionization spaces 20, 20' are arranged symmetrically in relation to the third pole disk 6 and have approximately equal dimensions.

The ferromagnetic guide means, which is oriented toward the axis 7 in the radial direction, in the region of the inner pole of the permanent magnet ring 1, is designed as a third pole disk 6 and also has an opening 31' in the center for guiding through the second electrode 4.

If more than one permanent magnet ring 1 is used, in accordance with FIG. 6a, additional pole disks can be used in the region of each pole of the permanent magnet rings, whereby further ionization spaces are then divided. Optionally, however, pole disks can also be omitted above the poles of the permanent magnet rings. In contrast, the design shown in FIGS. 7 and 8 is preferred, having three pole disks and a single permanent magnet ring 1, in particular in a symmetrical design. The pole disks are advantageously designed as circular disks.

In the advantageous design of the measuring chamber 107 shown in FIG. 7, the first electrode 3 is designed as a separate cylinder, preferably in the form of sheet metal, arranged coaxially spaced apart from the inner wall of the tubular housing 101. A gap 63 is thus formed in between. The electrode cylinder 3 encloses the measuring chamber 107 and it is connected, terminated on both sides, to the first and the second pole disk 5a, 5b. The width of the gap 63 is comparatively small in comparison to the measuring chamber diameter, but sufficiently large to achieve a sufficient conductance for guiding through or distributing the measuring gas from the measuring inlet 8 via the entire ionization space 20, 20' up into the region of the feedthrough 103.

The first and second pole disks 5a, 5b, and optionally the third pole disk 6 or further ones, preferably two thereof, rest on the periphery thereof on the inner wall of the housing 101, wherein webs 35 are formed on the periphery of the pole disks in the region of the gap 63, with interrupting regions or openings. By way of these openings on the edge of the pole disks, a connection is established from the measuring inlet 8 via the coaxial gap 63 along the electrode cylinder up to the feedthrough 103. This design of the measuring chamber, having the electrode cylinder, together with the pole disks 5a, 5b, 6, therefore forms a unit which is insertable into the housing and therefore easily replaceable, the mentioned replaceable measuring chamber 107. This measuring chamber 107 can now be replaced easily as needed when the ionization chamber 20, 20' has a degree of soiling which is no longer tolerable after a specific operating time. For further simplification, as mentioned, a stop for the measuring chamber position, for example, a positioning shoulder 61, can be provided on the inner wall of the housing 101.

During replacement, the measuring chamber 107 is simply pushed via the measuring inlet 8 into the housing 101 until it stops on this positioning shoulder 61. The measuring chamber 107 can then additionally be secured on the side of the measuring inlet 8 in the position using an element for fixing for example, a snap ring 68.

It is advantageous if at least individual ones of the pole disks have, in addition to the center opening 31, 31', 31'', at least one additional opening, preferably multiple openings 32, 32'. In the case of multiple openings, for example, boreholes, they are to be arranged uniformly, in particular in a ring shape. In this case, it is advantageous if above all the first pole disk 5a, which faces toward the measuring inlet 8, and if necessary the third pole disk 6 have at least one such additional opening 32, 32', which are arranged distributed over the disk. The permeability for the measuring gas in the ionization space 20, 20' is increased using these additional openings.

An ignition aid 33 (see FIG. 8) can be arranged on the second rod-shaped electrode 4 for certain cases, in the region inside the ionization spaces 20, using which the ignition of the discharge can be initiated better. It consists, for example, of a small metal part, such as a small plate, which has sharp edges or tips, on which the field emission of free charge carriers is caused using a voltage pulse.

As already mentioned, it is very important for reliable long-term function of the measuring cell to shield the insulator parts 41, 41', 42 (glass/ceramic/glass) of the feedthrough 103 particularly carefully. A particularly suitable design is selected in FIG. 7 and, in detail, in FIG. 8.

As already mentioned above, the ceramic cylinder as the insulation part 42 protrudes beyond one insulation part 41', and preferably both insulation parts, which are designed as glass rings 41' and 41. A metallic mounting ring 43, as the metal fitting, is connected to the second insulator part 41 to form a seal, i.e., fused to the second glass ring. The metal fitting 43, which is ring-shaped here, supports the feedthrough 103. The metal fitting 43 is connected on the periphery to one end of the housing 101, which is opposite to the measuring inlet 8, at 45 to form a seal. The connection at 45 to the housing 101 is advantageously welded, in particular laser welded. Above all a stainless steel (inox) is suitable as a material for the metal fitting 43, wherein a nonmagnetic steel is preferred, so as not to impermissibly influence the discharge in the ionization space. The housing 101 advantageously also consists of a nonmagnetic, stainless steel (inox).

At least one second cylinder 60 is arranged coaxially to the axis 7 around the center opening 31 of the second pole disk 5b in the direction of the feedthrough 103. This second pole disk 5b is positioned in relation to the feedthrough 103 and the two cylinders 42, 60 are dimensioned in length and diameter such that the second cylinder 60 protrudes into the first, spaced apart therefrom. Both cylinders are arranged coaxially to one another and to the axis 7. In this case, in the region of the overlap b, the two cylinders 42, 60 are spaced apart radially from one another such that they do not touch and a gap a is formed in the radial direction. This gap a forms an insulation distance in vacuum. Using such an arrangement, the leakage distance on the surface of the insulators is lengthened and shielding regions result, in which atomized material cannot go out of the ionization space. The surface of the insulators, namely the glass rings and the ceramic cylinder in the design according to the invention, thus remains protected from contamination at least in partial regions, however, at least the path via conducting coverings and therefore for possible leakage currents from the second electrode 4 toward the housing 101 is interrupted.

As mentioned, glass is used according to the invention as the insulation material for both insulator parts 41, 41'. Since the cylinder 42 consists of ceramic in the design according to the invention of the feedthrough 103, i.e., also of an insulating material, the shielding effect is additionally improved. The insulating material of the cylinder 42 is ceramic. The second cylinder 60 on the second pole disk 5b, in contrast, advantageously consists of a metal, wherein it is advantageously not ferromagnetic. In addition to the use of a single pair of interlocking cylinders 42, 60, for further improvement of the shielding effect, one further or even multiple further interlocking cylinders can be used. The illustrated solution according to FIGS. 7 and 8 having a single pair of cylinders 42, 60, in contrast, is a particularly suitable and cost-effectively implementable design.

The plunging depth or overlap b of the two cylinders 42, 60 is, for example, 1.0 mm, with a preferred range of 0.1 mm to 3.0 mm. The distance (gap) a between the two cylinders 42, 60 in the radial direction is, for example, 0.5 mm, with a preferred range of 0.2 mm to 10.0 mm.

In the design according to the invention, the first cylinder of the feedthrough 107 consists of a ceramic, for example, of aluminum oxide having the specific resistance at 20° C.>10E17 ohm m, and 10E13 ohm m at 200° C. (FRIALIT F99.7, Friatec Elektrische Durchführungen and Isolierrohre, ceramic metal composite components, 1126/3 2 VII 04 Gr., brochure 1279). In the design according to the invention of the feedthrough 103, a glass is used as the material of the first and the second insulator parts 41, 41', such as Schott 8250 log, the electrical volume resistance at 250° C. of which is 10.0 ohm cm (Brochure Schott Technical Glasses, physical and technical properties, 90491 English 04100.7 kn/lang, 2010), corresponding to 10E12 ohm m.

In addition, between the second pole disk 5a, the feedthrough 103, the centrally arranged shielding device, implemented by the cylinders 42, 60 and the inner wall of the housing 101, a ring-shaped chamber 47 can be formed, in which an auxiliary vacuum sensor 48 is arranged, for example. The use of a Pirani sensor or a membrane pressure sensor is particularly suitable as the auxiliary vacuum sensor. The sensors are small in construction and can be elegantly housed in this ring-shaped chamber 47 in the region of the feedthrough 103. They are additionally also reliably protected from undesired deposits from the ionization space by the shielding device 42, 60, i.e., in the embodiment according to the invention, ceramic cylinder 42 and metal cylinder 60.

In addition, for example, in particular the Pirani measuring cell can be provided with a further protective arrangement 49. The feedthrough elements additionally required for such measuring cells, feedthrough rods or pins 44, can be provided easily in combination with the feedthrough 103. Such feedthrough rods 44 can be integrated directly in the insulator part 41, for example, and/or, and this is preferable, also in the metal fitting 43. Using such auxiliary vacuum sensors 48, the usage range of the vacuum measuring cell 30 can be substantially expanded. Such a combination measuring cell enables the precisely measurable vacuum pressure range to be substantially expanded.

One embodiment of the ionization vacuum measuring cell according to the invention, for example, according to FIGS. 7 and 8, comprises:

a) a housing, which can be evacuated, having a measuring fitting for the vacuum to be measured, b) a first and a second electrodes, which are arranged essentially coaxially and spaced apart from one another, and having a common axis, whereby an ionization space in a measuring chamber is formed between these two electrodes, which is arranged communicating with the measuring fitting, wherein the first electrode forms the outer electrode and it is essentially has a cylindrical surface, and the second electrode is designed rod-shaped and is located on the axis, c) an electrically insulating and vacuum-tight feedthrough arranged on one end of the housing on the side opposite to the measuring fitting, wherein it has an insulator arranged about the axis and the second rod-shaped electrode is guided through this insulator to form a seal. The measuring cell furthermore comprises a measuring chamber in or on the housing, and at least one first electrode therein.

The measuring chamber is designed as a replaceable component and/or the electrically insulating and vacuum-tight feedthrough has a ceramic cylinder, which is coaxial to the axis, having an inner surface radially spaced apart from the rod and a first glass ring, which is fused onto the inner surface on one side and the rod on the other side, axially set back from an end face of the ceramic cylinder facing toward the ionization space. The feedthrough then furthermore comprises a metal fitting having a cylinder opening, which is coaxial to the axis, having an opening inner surface radially spaced apart from the cylindrical outer surface of the ceramic cylinder. The feedthrough then furthermore comprises a second glass ring, which is fused onto the cylindrical outer surface of the ceramic cylinder, set back axially from the end face of the ceramic cylinder facing toward the ionization space, wherein the opening inner surface is connected in a vacuum-tight manner to the second glass ring. In both mentioned alternatives and the combination thereof, corresponding to the first or second aspect of the present application and the combination thereof, the measuring cell furthermore comprises d) at least one permanent magnet ring, which encloses the coaxial arrangement of the electrodes, having magnetization direction aligned essentially radially in relation to the axis and having a ferromagnetic yoke enclosing this permanent magnet ring, wherein the yoke is guided away from the permanent magnet ring in the axial direction on both sides and guided after a predefined distance from the permanent magnet ring on both sides in the radial direction toward the axis and the first electrode. This first electrode is the outer electrode of the coaxial arrangement of the electrodes in this case, such that the yoke forms two ring-shaped poles on both sides and spaced apart from the permanent magnet ring, via which at least a part of the field lines of the permanent magnet ring close inside the measuring chamber, while penetrating the first electrode. A ring-shaped tunnel-type magnetic field is formed around the axis at least partially via the first electrode inside the measuring chamber. Furthermore, disk-shaped ferromagnetic guide means are arranged in the radial direction, oriented toward the axis, in the region of at least one of the internal poles of the yoke, which are formed as the first and second pole disks and the centers of which each have an opening around the axis for guiding through the second electrode and for the measuring gas passage. A shielding device is arranged between the feedthrough and the second pole disk facing toward it in the radial region of the insulator and coaxially to the axis to protect the insulator from contamination by atomized particles from the ionization space.

This measuring cell according to the invention can be refined as follows:

A) in that, in the sectional plane in which the axis lies, the yoke is guided at least partially in an arc shape in the radial direction toward the first electrode.

B) in that, in the sectional plane in which the axis lies, the yoke is guided at least partially at an angle, preferably perpendicularly, in the radial direction toward the first electrode.

C) in that, inside the yoke having the two poles spaced apart from one another in the axial direction, at least two permanent rings having opposing magnetization direction are arranged, wherein each permanent magnet ring pair forms a further ring-shaped and tunnel-type magnetic field via the first electrode.

D) in that, inside the yoke having the two poles spaced apart from one another in the axial direction, two permanent magnet rings having opposing magnetization direction are arranged.

E) in that the housing encloses both the permanent magnet ring with the yoke as well as the two electrodes.

F) in that the yoke forms part of the housing.

G) in that the housing is arranged between the first electrode and the permanent magnet ring with the yoke such that the permanent magnet ring and the yoke are arranged separated by the vacuum.

H) in that the first electrode is designed as a housing.

I) in that the at least one permanent magnet ring is arranged spaced apart unequally in relation to the poles in the axial direction inside the yoke.

J) in that the at least one permanent magnet ring is arranged so it is displaceable in relation to the poles in the axial direction inside the yoke.

K) in that, oriented in the radial direction toward the axis, ferromagnetic guide means are arranged in the region of the inner pole of the permanent magnet ring and these are designed as a pole disk, which has an opening in the center for guiding through the second electrode.

L) in that the first and second pole disks, together with the first electrode, which, spaced apart therefrom, encloses the axis with the second electrode, form the measuring chamber.

M) in that the feedthrough has an at least two-part insulator in the center, which encloses the second rod-shaped electrode with the first insulator part to form a seal, wherein the second insulator part encloses the first in a ring shape in the radial direction toward the axis, and at least one first cylinder is arranged in between to form a seal, which coaxially encloses the axis and protrudes beyond the insulation parts on both sides, wherein a metallic fitting is connected to the second insulator part to form a seal and supports the feedthrough and is connected to one end of the housing to form a seal.

N) in that, around the center opening of the second pole disk in the direction of the feedthrough, at least one second cylinder is arranged coaxially to the axis, which protrudes into the first cylinder with an overlap, wherein the two cylinders are arranged spaced apart from one another in the region of the overlap, such that they do not touch and a gap is formed in the radial direction.

O) in that at least one of the two insulator parts is formed from glass.

P) in that the first cylinder consists of an insulating material, preferably of a ceramic.

Q) in that the second tube part (60) consists of a metal which is not ferromagnetic.

R) in that the first electrode is designed as a separate cylinder part in the form of sheet-metal and is arranged spaced apart from the inner wall of the housing, coaxially spaced apart to form a gap in between, and is terminated on both sides with the first and the second pole disk, while enclosing the measuring chamber.

S) in that the pole disks press against the inner wall of the housing on the periphery and form webs in the region between the gap of the first electrode of the housing with interrupting regions, which provide a connection from the measuring inlet up to the feedthrough.

T) in that the cylinder part in the form of sheet-metal, together with the pole disks, forms a measuring chamber unit which is insertable into the housing and therefore replaceable.

U) in that the first pole disk and optionally the third pole disk have at least one further opening, preferably more, which are arranged distributed over the disk to increase the permeability for the measurement gas in the ionization space.

V) in that a ring-shaped chamber, in which an auxiliary vacuum sensor is arranged, is formed between the second pole disk, the centrally arranged shielding device, and the inner wall of the housing.

W) in that the auxiliary vacuum sensor is a Pirani sensor or a membrane pressure sensor.

FIG. 10 shows a good refinement of the feedthrough 103, which was already presented on the basis of FIGS. 7 and 8, in a simplified longitudinal sectional view. The metal rod 112, which is to be fed through in an electrically insulated and vacuum-tight manner, is located on the axis 110 of the feedthrough 103, according to FIG. 7, for example, electrode 4 or an electrical supply to one of the electrodes in the ionization space.

A ceramic cylinder 114 is, coaxially with the axis 110, potted via a glass ring 116 with the metal rod 112. The external cylinder surface of the ceramic cylinder 114 is in turn connected via a second glass ring 118 to the metal fitting 120. The metal fitting 120 has an opening 122 coaxial to the axis 110 for this purpose and the further glass ring 118 is, as mentioned, potted on one side with the outer surface of the ceramic cylinder 114, and on the other side with the cylindrical opening surface of the opening 122.

As is furthermore schematically shown in FIG. 11, multiple pairs of first glass rings 116, 116a, 116b and associated ceramic cylinders 114a, 114b can optionally be provided, to further increase the electrical insulation of the feedthrough 103.

As already explained on the basis of FIG. 7, cylinders are optionally provided on the ionization vacuum measuring cell, on the ionization space side, as shown by dashed lines in FIG. 11 at 125, and correspond to cylinder 60 of FIG. 7, which protrudes beyond the ceramic cylinder 114 of the feedthrough 103 inside this cylinder 114 or outside this cylinder 114 without contact.

Proceeding from the feedthrough 103 according to FIG. 10 and in the same view, FIG. 12 shows the feedthrough 103 supplemented with one or more lateral feedthroughs 130 having feedthrough rods 132, for example, for the additional pressure sensors according to 48 of FIG. 7 and/or for setting the potential of the second or a further electrode in the ionization space. The lateral feedthroughs 130 are provided in the metal fitting 120. The axis 134 thereof is typically parallel to the axis 110, but in certain applications can be arranged skewed in relation to the axis 110, but in any case having a directional component parallel to the axis 110, however.

The lateral feedthroughs 130 are formed in each case by a borehole 136, through the metal fitting 120, in which the rod or pin 132 to be fed through is arranged coaxially. The rod or pin 132 is fused by the glass of a glass insert 138 to the metal fitting 120, vacuum-tight in the borehole 136 and electrically insulated from the wall of the borehole 136.

If, as is typical, multiple lateral feedthroughs 130 are provided, which are arranged to provide the most direct possible electrical access to components on the ionization space side, these lateral feedthroughs 130, for optimal positioning, neither have to be radially spaced apart equally with respect to the feedthrough axis 110, nor have to be equally distributed along the periphery, i.e., azimuthally with respect to the axis 110.

If boreholes 136 are provided in the metal fitting 120, which are not to be used for a feedthrough 130 for a specific application, such a borehole 130 can be sealed vacuum-tight, as shown by dashed lines at $130_o$ in FIG. 12, by means of a molten glass insert.

Upon observation of FIG. 12, it is readily apparent that the feedthrough 103 is relatively simple to implement by manufacturing, by appropriate positioning of rod 112, cylinder 114, metal fitting 120, and feedthrough rod 134, provision of powdered glass in the corresponding openings/boreholes, and the fusing thereof. It is furthermore apparent in this case that the mentioned feedthrough 103 is already subjected to high thermal stresses, which are partially inhomogeneously distributed, during the manufacturing. Various material pairs, namely metal/glass, then glass/ceramic, ceramic/glass, glass/metal, metal/glass, and finally glass/metal are provided thereon. These pairs of different materials, the possibly staggered formation of the actual fusion actions on the fusion zones, i.e., material transitions, and inhomogeneities in the respective materials, which can never be precluded, in particular the glass or the ceramic, can have the result, in addition to differing thermal behavior of the materials, that high stresses arise in the glass inserts 138 of the lateral feedthrough 130. These can have the result that, both during the thermal stress or during the cooling or only substantially later, for example, in the event of mechanical shock stress in operation of the measuring cell, cracks, such as hairline cracks, can occur in the glass inserts 138, which massively reduce, if not destroy, the vacuum-tightness and also the electrical insulation capability thereof.

The problem of high stresses in the glass inserts 138 at the lateral feedthroughs 130 in the metal fitting 120 was fundamentally solved in that, as schematically shown in FIG. 13, the metal fitting 120 is divided into two parts $120_i$ and $120_a$, which are "displaceable" in relation to one another within limits and primarily in the radial direction. The lateral feedthroughs 130 are provided on the outer part 120 with respect to the axis 110. The integrity of the two parts as the metal fitting 120 is established by a connecting part 145, which acts as a stress buffer, of the two parts $120_i$, $120_a$. This buffer zone, which can be provided along a separating gap 140 between the mentioned parts of the metal fitting 120, is formed as a material zone which circumferentially bridges this gap and can comprise relatively ductile metal and/or can be embodied as sufficiently thin that it absorbs the stresses practically like a spring and transmits them homogeneously into the outer part $120_a$ of the metal fitting 120. Therefore, in the embodiment according to FIG. 13, the metal fitting 120 is divided by a ring gap 140, which is coaxial with respect to axis 110 of the feedthrough 103, into an inner part $120_i$ and an outer part $120_a$, preferably both made of the same metal. The lateral feedthrough 130 already proposed on the basis of FIG. 12 rides in the outer part $120_a$. The integrity of the metal fitting 120 is caused by the bridge part acting as a buffer zone, shown as 145 in FIG. 13.

Instead of a ring gap 140, the inner part $120_i$ and outer part $120_a$ of the metal fitting 120, as is schematically shown in FIG. 14, can be designed so that they can be radially displaced along at least one plane E, perpendicular to the axis 110, at which the two parts $120_i$ and $120_a$ press against one another. As shown in FIG. 14, the integrity of the part 120 together with vacuum-tightness can be formed by a circumferential connecting seam, such as a weld seam or solder seam 150. The fundamental embodiment according to FIG. 14 has the advantage that the two parts are guided in the radial expansion direction and therefore cannot be mutually angled in relation to one another, which could result in bending tensions in particular on the glass ring 118 according to FIG. 11 and adjoining ceramic cylinder.

In the embodiment according to FIG. 14, the coaxial gap 140 according to FIG. 13 is actually formed as a space region open toward the axis 110, which assumes the gap function with respect to radial displaceability of the outer part $120_a$ in relation to the inner part $120_i$, and therefore is also identified with 140 in FIG. 14.

In the embodiment according to FIG. 15, as is readily disclosed to a person skilled in the art, the embodiments according to FIGS. 13 and 14 are combined. On the one hand, the two parts are guided in their radial relative expansion movement along two planes $E_1$ and $E_2$, perpendicular to the axis 110 of the feedthrough, on the other hand, a multipart ring gap 140, which is radially divided into offset sections, is provided, which ensures the required relative radial mobility to absorb the tensions. According to FIG. 15, the integrity of the metal fitting 120 is ensured by at least one connecting seam circumferential in relation to the axis 110, such as a weld seam or solder seam, and a further connecting web can also be established, for example, segmented therein, on the side of the metal fitting 120 facing away from the seam 150, as shown at $150_b$ in FIG. 15. It has to be noted that the bridge part, which ensures the integrity of the metal fitting 120, both has to be electrically conductive, if the two parts $120_a$ and $120_b$ are to be operated at equal electrical potential, as is typical, and has to ensure vacuum-tightness.

Instead of a connecting seam, the bridge part, as shown in FIG. 16, can be produced by webs $145_1$ and optionally $145_2$, which are produced by incorporating the gap structure 140 in the material of the metal fitting 120. Of course, a combination of connecting seam and connecting web made of the material of the metal fitting 120 is also possible.

As already mentioned several times, the ionization vacuum measuring cell has, under one aspect of the invention, a measuring chamber, which can be removed practically as a replacement part by simple manipulation from the measuring cell and replaced, for example, by another measuring chamber. One of the possible implementations is shown schematically and in simplified form in FIG. 17. The replaceable measuring chamber 107 with measuring gas fitting 8 comprises in any case, as indicated by dashed lines, the one electrode 3 and therefore, neglecting the second electrode, the ionization space and furthermore, according to FIG. 17, a section $101_b$ of the housing 101. The measuring chamber 107, also comprising the housing section $101_b$, which is coaxial with respect to the axis 7, is connected at a connecting zone 152 to the remaining housing part $101_a$, for example, by means of a bayonet fitting, a screw connection, etc. The ability to replace the measuring chamber 107 is indicated in FIG. 17 by the double arrow AU.

The electrically insulating and vacuum-tight feedthrough 103 can be provided in this case (not shown in FIG. 17) on the remaining housing part $101_a$ or on the measuring chamber 107. In the latter case, the electrode which is fed through on the mentioned feedthrough 103 is also replaced with the measuring chamber 107.

In the embodiment as is shown in simplified and schematic form in FIG. 18, the measuring chamber 107 is inserted on the side of the measuring gas fitting 8 into the housing 101 and fixed therein. In the case of provided magnetization arrangements, as were described, sufficient intrinsic fixing of the measuring chamber 107 in the housing 101 is often already produced thereby. The feedthrough 103 can also be fixedly connected to the housing 101 or to the replaceable measuring chamber 107 in this embodiment.

If additional locking of the measuring chamber 107, which is preferably inserted to a stop on the housing 101, this can be implemented by locking means, such as a lock ring or bolt through the wall of the housing 101 or ball catch connections etc.

As was already mentioned, the electrically insulating and vacuum-tight feedthrough 103 is extremely sensitive with respect to contamination. If, as shown in extremely simplified and schematic form in FIG. 9, the replaceable measuring chamber 107 does not comprise the mentioned feedthrough 103, but rather the latter is fixedly connected to the housing 101, the rod which is fed through, which is identified with 104 in FIG. 9, must in any case also be introduced in an electrically insulated manner into the measuring chamber 107, into the ionization space therein. For this purpose, a feedthrough 109, which is only electrically insulating, but not vacuum-tight, is to be provided on the measuring chamber 107. A feedthrough 109 which is only electrically insulating is therefore provided coaxially to axis 7 and therefore feedthrough 103 on the measuring chamber 107, through which the rod 104 is guided deeply. In FIG. 9, the measuring cell is constructed, solely as an example, as a Penning cell having cathode $4_K$ and anode $3_A$. If necessary, to ensure the ability to replace measuring chamber 107, as schematically indicated in FIG. 9 at 106, sections of the rod 104 can be coupled by detachable plug connections.

With the feedthrough 109 practically pressing against the rod 104, the feedthrough 103 is protected highly effectively from contaminations from the ionization space.

The invention claimed is:

1. An ionization vacuum measuring cell comprising:
   a) a housing having a measuring fitting for the vacuum to be measured at one end section of the housing,
   b) a first and a second electrodes in the housing, whereby an ionization space is formed inside the housing between these two electrodes,
   c) an electrically insulating, vacuum-tight feedthrough for an electrical supply connection to one of said first and second electrodes or for one of said first and second electrode itself, said feedthrough having an electrical insulator, characterized in that
   the electrical supply connection or the electrode which is fed through is a metal rod on an axis, and wherein the feedthrough comprises:
   i) a ceramic hollow cylinder, which is coaxial to the axis, having an inner surface spaced apart radially from the rod,
   ii) a first glass ring, which is fused onto the inner surface and the rod, and is set back axially from an end face of the ceramic hollow cylinder facing toward the ionization space,
   iii) a metal fitting having a cylindrical bore coaxial to the axis, having an inner surface of said cylindrical bore spaced apart radially from the cylindrical outer surface of the ceramic hollow cylinder,
   iv) a second glass ring, which is fused onto the cylindrical outer surface of the ceramic hollow cylinder,
   v) wherein the inner surface of said cylindrical bore is connected vacuum-tight to the second glass ring.

2. The ionization vacuum measuring cell according to claim 1, characterized in that said first and second electrodes are arranged coaxially with respect to the axis, wherein the first electrode has a cylindrical inner surface as the electrode surface facing to the ionization space, and wherein said cylindrical inner surface of the first electrode is spaced apart radially from the axis.

3. The ionization vacuum measuring cell according to claim 1, characterized in that the second glass ring is fused onto the inner surface of said cylindrical bore.

4. The ionization vacuum measuring cell according to claim 1, characterized in that the second glass ring is connected to the inner surface of said cylindrical bore in a sealed manner via one or more pairs of a further coaxial ceramic hollow cylinder/a further coaxial glass ring.

5. The ionization vacuum measuring cell according to claim 1, characterized in that one or more through boreholes are provided, said through bore holes having a directional component axially parallel with respect to the axis through the metal fitting and having inner borehole surfaces, which each define a borehole axis, in that a metal feedthrough rod is arranged in at least part of the borehole in the respective borehole axis, and in that the respective inner borehole surface and the respective feedthrough rod are fused with a glass insert in a sealed manner.

6. The ionization vacuum measuring cell according to claim 5, characterized in that the metal fitting comprises an inner ring, which forms the opening of the metal fitting, and a further part of the metal fitting comprises a further opening which is coaxial to the axis, wherein the inner ring and the further part of the metal fitting are connected vacuum-tight by means of a bridge part ring, and the bridge part ring is formed by a connecting seam or, if the inner ring and the further part are integrally formed, by a ring web which produces integrity, wherein metal rod feedthroughs are installed in the further part of the metal fitting.

7. The ionization vacuum measuring cell according to claim 6, characterized in that the inner ring and the opening in the further part of the metal fitting are aligned on one another or are offset in relation to one another in axial direction.

8. The ionization vacuum measuring cell according to claim 1, characterized in that at least the electrically insulating, vacuum-tight feedthrough for the electrical supply connection to one of said first and second electrodes or for one of said first and second electrodes itself is shielded from contamination toward the ionization space by a further non-vacuum-tight, electrically insulated feedthrough.

9. The ionization vacuum measuring cell according to claim 1, characterized in that, spaced apart from the electrically insulating, vacuum-tight feedthrough in the axial direction toward the ionization space, an electrically conductive plate arrangement is provided, having an opening coaxial to the feedthrough, through which the electrical supply connection to one of said first and second electrodes or one of said first or second electrodes itself protrudes towards the ionization space, wherein the opening is enclosed by a cylinder protruding from the surface of the plate arrangement facing toward the feedthrough, which protrudes into the ceramic hollow cylinder of the feedthrough without contact, or protrudes externally beyond the ceramic hollow cylinder of the feedthrough without contact.

10. The ionization vacuum measuring cell according to claim 1, wherein:
    a) the housing can be evacuated, b) the first and second electrodes are arranged coaxially and spaced apart from one another, and have a common axis, whereby a measuring chamber is formed between these two electrodes, whereby the ionization space is formed in the measuring chamber, which is arranged communicating with the measuring fitting, wherein the first electrode forms the outer electrode and comprises a cylindrical surface, and wherein the second electrode is designed rod-shaped and is located on the axis, c) the electrically insulating vacuum-tight feedthrough is arranged on one end of the housing on the side opposite to the measuring fitting, wherein it has an insulator arranged about the axis, and wherein the second rod-shaped electrode is guided through this insulator in a sealed manner, and wherein the ionization vacuum measuring cell further comprises:

d) at least one permanent magnet ring, which encloses the coaxial arrangement of the electrodes, having magnetization direction aligned radially in relation to the axis and having a ferromagnetic yoke enclosing this permanent magnet ring, characterized in that the yoke is guided away from the permanent magnet ring in the axial direction on both sides and guided after a predefined distance from the permanent magnet ring on both sides in the radial direction toward the axis and the first electrode, wherein the first electrode forms the outer electrode of the coaxial arrangement of the electrodes, such that the yoke forms two ring-shaped poles on both sides and spaced apart from the permanent magnet ring, via which at least a part of the field lines of the permanent magnet ring close inside the measuring chamber, while penetrating the first electrode, wherein a ring-shaped tunnel-type magnetic field is formed around the axis at least partially via the first electrode inside the measuring chamber and disk-shaped ferromagnetic guide means are arranged in the radial direction, oriented toward the axis, in the region of at least one of the internal poles of the yoke, which are formed as the first and second pole disks and the center of which has an opening around the axis, respectively, for guiding through the second electrode and for the measuring gas passage, wherein a shielding device is arranged between the feedthrough and the second pole disk facing toward it in the radial region of the insulator and coaxially to the axis to protect the insulator from contamination by atomized particles from the measuring chamber, which forms an ionization space, and the insulator comprises a ceramic hollow cylinder having an inner surface facing toward the second electrode, and a glass ring fused thereon and on the second electrode.

11. The ionization vacuum measuring cell of claim 1, wherein:
wherein the ionization vacuum measuring cell further comprises:
a) a measuring chamber in the housing, which is connected to the measuring fitting for a gas flow; and wherein
b) the first and second electrodes are located in the measuring chamber, are arranged coaxially with respect to an axis and are spaced apart from one another, whereby the ionization space is formed in the measuring chamber between these two electrodes, wherein the first electrode has a cylindrical inner surface as the electrode surface facing toward the ionization space;

characterized in that the measuring chamber is designed as a replaceable part.

12. The measuring cell according to claim 11, characterized in that the measuring chamber is radially delimited to the outside with respect to the axis by
a) the first electrode, or
b) a measuring chamber housing, which abuts entirely, sectionally, or not at all against an inner surface of the housing, having a cylindrical inner surface, which is offset radially outward from the first electrode,
c) at least one axial section of the wall of the housing.

13. The measuring cell according to claim 11, characterized in that the measuring chamber has, on the axial end facing away from the measuring fitting an electrically insulated second feedthrough for the electrical supply connection to one of said first and second electrodes or for one of said first and second electrodes itself.

14. The measuring cell according to claim 11, characterized in that the measuring chamber is insertable from the measuring fitting side into the housing until it abuts onto or into the housing and is detachably lockable on the housing.

15. The measuring cell according to claim 11, characterized in that at least a part of a magnetization arrangement, which generates a magnetic field in the ionization space, is provided radially outside the measuring chamber.

16. The measuring cell according to claim 11, characterized in that the measuring chamber cannot be disassembled non-destructively.

17. The measuring cell according to claim 1, which is constructed as an inverted magnetron cell.

18. The ionization vacuum measuring cell of claim 1, wherein:
a) the housing is evacuated,
b) the first and second electrodes are coaxial and spaced apart from one another, and have a common axis, whereby a measuring chamber is formed between these two electrodes, whereby the ionization space is formed in the measuring chamber, which is arranged communicating with the measuring fitting, wherein the first electrode forms the outer electrode and it has a cylindrical surface, and wherein the second electrode is designed rod-shaped and is located on the axis,
c) the electrically insulating vacuum-tight feedthrough is arranged on one end of the housing on the side opposite to the measuring fitting, wherein it has an insulator arranged about the axis and the second rod-shaped electrode is guided through this insulator to form a seal, and wherein the ionization vacuum measuring cell further comprises:
d) at least one permanent magnet ring, which encloses the coaxial arrangement of the electrodes, having magnetization direction aligned radially in relation to the axis and having a ferromagnetic yoke enclosing this permanent magnet ring, characterized in that the yoke is guided away from the permanent magnet ring in the axial direction on both sides and guided after a predefined distance from the permanent magnet ring on both sides in the radial direction toward the axis and the first electrode, wherein the first electrode forms the outer electrode of the coaxial arrangement of the electrodes, such that the yoke forms two ring-shaped poles on both sides and spaced apart from the permanent magnet ring, via which at least a part of the field lines of the permanent magnet ring close inside the measuring chamber, while penetrating the first electrode, wherein a ring-shaped tunnel-type magnetic field is formed around the axis at least partially via the first electrode inside the measuring chamber and disk-shaped ferromagnetic guide means are arranged in the radial direction, oriented toward the axis, in the region of at least one of the internal poles of the yoke, which are formed as the first and second pole disks and the center of which has an opening in each case around the axis for guiding through the second electrode and for the measuring gas passage, wherein a shielding device is arranged between the feedthrough and the second pole disk facing toward it in the radial region of the insulator and coaxially to the axis to protect the insulator from contamination by atomized particles from the measuring chamber, which forms an ionization space, and at least the first electrode is installed in a replaceable insertion chamber.

* * * * *